(12) United States Patent
Choi et al.

(10) Patent No.: US 10,415,116 B2
(45) Date of Patent: *Sep. 17, 2019

(54) CO-CURRENT AND COUNTER CURRENT RESIN-IN-LEACH IN GOLD LEACHING PROCESSES

(71) Applicant: BARRICK GOLD CORPORATION, Toronto (CA)

(72) Inventors: Yeonuk Choi, Oakville (CA); Samir Chefai, Milton (CA)

(73) Assignee: Barrick Gold Corporation, Toronto (CA)

( * ) Notice: Subject to any disclaimer, the term of this patent is extended or adjusted under 35 U.S.C. 154(b) by 22 days.

This patent is subject to a terminal disclaimer.

(21) Appl. No.: 15/726,091

(22) Filed: Oct. 5, 2017

(65) Prior Publication Data

US 2018/0030571 A1 Feb. 1, 2018

Related U.S. Application Data

(60) Continuation of application No. 13/958,683, filed on Aug. 5, 2013, now Pat. No. 9,790,572, which is a division of application No. 13/313,594, filed on Dec. 7, 2011, now Pat. No. 8,715,389.

(60) Provisional application No. 61/420,596, filed on Dec. 7, 2010.

(51) Int. Cl.
| | | |
|---|---|---|
| *C22B 3/00* | (2006.01) | |
| *C22B 3/12* | (2006.01) | |
| *C22B 3/24* | (2006.01) | |
| *B01D 11/02* | (2006.01) | |
| *C22B 3/42* | (2006.01) | |

(52) U.S. Cl.
CPC ........... *C22B 11/04* (2013.01); *B01D 11/0257* (2013.01); *C22B 3/12* (2013.01); *C22B 3/24* (2013.01); *C22B 3/42* (2013.01); *Y02P 10/234* (2015.11)

(58) Field of Classification Search
CPC ....... B01D 11/0257; C22B 11/04; C22B 3/12; C22B 3/24; C22B 3/42
USPC .......... 266/101, 114; 75/744, 114, 741, 739, 75/723, 711
See application file for complete search history.

(56) References Cited

U.S. PATENT DOCUMENTS

| | | |
|---|---|---|
| 496,951 A | 5/1893 | Parkes |
| 1,627,582 A | 5/1927 | Terry |
| 3,317,313 A | 5/1967 | Biiggs |
| 3,454,503 A | 7/1969 | Blankenhorn |

(Continued)

FOREIGN PATENT DOCUMENTS

| | | |
|---|---|---|
| AU | 4576985 | 6/1986 |
| AU | 574818 | 7/1988 |

(Continued)

OTHER PUBLICATIONS

Examiner's Report for Canadian Patent Application No. 2,915,269, dated Nov. 9, 2018, 3 pages.

(Continued)

*Primary Examiner* — Scott R Kastler
*Assistant Examiner* — Michael Aboagye
(74) *Attorney, Agent, or Firm* — Sheridan Ross P.C.

(57) ABSTRACT

A method and system are provided in which a gold and/or silver-collecting resin-in-leach circuit comprises both co-current and counter-current sections.

33 Claims, 7 Drawing Sheets

(56) References Cited

U.S. PATENT DOCUMENTS

| | | |
|---|---|---|
| 3,524,724 A | 8/1970 | Every et al. |
| 3,833,351 A | 9/1974 | Neskora et al. |
| 3,843,771 A | 10/1974 | Urban |
| 3,902,896 A | 9/1975 | Borbely et al. |
| 3,979,207 A | 9/1976 | MacGregor |
| 4,070,182 A | 1/1978 | Genik-Sas-Berezowsky et al. |
| 4,256,706 A | 3/1981 | Heinen et al. |
| 4,269,622 A | 5/1981 | Kerley, Jr. |
| 4,289,532 A | 9/1981 | Matson et al. |
| 4,296,075 A | 10/1981 | Yan |
| 4,304,644 A | 12/1981 | Victorovich et al. |
| 4,369,061 A | 1/1983 | Kerley, Jr. |
| 4,384,889 A | 5/1983 | Wiewiorowski et al. |
| 4,411,612 A | 10/1983 | Holland |
| 4,411,873 A | 10/1983 | Yan |
| 4,489,984 A | 12/1984 | Savins |
| 4,510,027 A | 4/1985 | Wiewiorowski et al. |
| 4,528,166 A | 7/1985 | McDougall |
| 4,552,589 A | 11/1985 | Mason et al. |
| 4,571,264 A | 2/1986 | Weir et al. |
| 4,585,561 A | 4/1986 | Zlokarnik et al. |
| 4,605,439 A | 8/1986 | Weir |
| 4,632,701 A | 12/1986 | Genik-Sas-Berezowsky et al. |
| 4,634,187 A | 1/1987 | Huff et al. |
| 4,654,078 A | 3/1987 | Perez et al. |
| 4,654,079 A | 3/1987 | Nunez et al. |
| 4,684,404 A | 8/1987 | Kalocsai |
| 4,721,526 A | 1/1988 | Elmore et al. |
| 4,723,998 A | 2/1988 | O'Neil |
| 4,738,718 A | 4/1988 | Bakshani et al. |
| 4,740,243 A | 4/1988 | Krebs-Yuill et al. |
| 4,758,413 A | 7/1988 | Harris et al. |
| 4,765,827 A | 8/1988 | Clough et al. |
| 4,778,519 A | 10/1988 | Pesic |
| 4,801,329 A | 1/1989 | Clough et al. |
| 4,816,234 A | 3/1989 | Brison et al. |
| 4,816,235 A | 3/1989 | Pesic |
| 4,902,345 A | 2/1990 | Ball et al. |
| 4,913,730 A | 4/1990 | Deschenes et al. |
| 4,923,510 A | 5/1990 | Ramadorai et al. |
| 4,925,485 A | 5/1990 | Schulze |
| 4,980,134 A | 12/1990 | Butler |
| 5,051,128 A | 9/1991 | Kubo |
| 5,071,477 A | 12/1991 | Thomas et al. |
| 5,114,687 A | 5/1992 | Han et al. |
| 5,127,942 A | 7/1992 | Brierley et al. |
| 5,147,617 A | 9/1992 | Touro et al. |
| 5,147,618 A | 9/1992 | Touro et al. |
| 5,215,575 A | 6/1993 | Butler |
| 5,232,490 A | 8/1993 | Bender et al. |
| 5,236,492 A | 8/1993 | Shaw et al. |
| 5,244,493 A | 9/1993 | Brierley et al. |
| 5,246,486 A | 9/1993 | Brierley et al. |
| 5,308,381 A | 5/1994 | Han et al. |
| 5,338,338 A | 8/1994 | Kohr |
| 5,340,380 A | 8/1994 | Virnig |
| 5,344,479 A | 9/1994 | Kerfoot et al. |
| 5,354,359 A | 10/1994 | Wan et al. |
| 5,364,453 A | 11/1994 | Kohr |
| 5,385,668 A | 1/1995 | Greenhalgh et al. |
| 5,405,430 A | 4/1995 | Groves et al. |
| 5,443,621 A | 8/1995 | Kohr |
| 5,484,470 A | 1/1996 | Kristjansdottir et al. |
| 5,489,326 A | 2/1996 | Thomas et al. |
| 5,536,297 A | 7/1996 | Marchbank et al. |
| 5,536,480 A | 7/1996 | Simmons |
| 5,601,630 A | 2/1997 | Hoecker |
| 5,607,619 A | 3/1997 | Dadgar et al. |
| 5,626,647 A | 5/1997 | Kohr |
| 5,653,945 A | 8/1997 | Gathje et al. |
| 5,672,194 A | 9/1997 | Hunter et al. |
| 5,683,490 A | 11/1997 | Earley, III et al. |
| 5,733,431 A | 3/1998 | Green et al. |
| 5,785,736 A | 7/1998 | Thomas et al. |
| 5,837,210 A | 11/1998 | Simmons |
| 5,876,588 A | 3/1999 | Lalancette et al. |
| 5,939,034 A | 8/1999 | Virnig et al. |
| 5,961,833 A | 10/1999 | Green et al. |
| 6,156,186 A | 12/2000 | Mueller et al. |
| 6,165,344 A | 12/2000 | Green et al. |
| 6,180,072 B1 | 1/2001 | Veal et al. |
| 6,183,706 B1 | 2/2001 | King |
| 6,197,214 B1 | 3/2001 | Virnig et al. |
| 6,248,301 B1 | 6/2001 | Hannaford et al. |
| 6,251,163 B1 | 6/2001 | King |
| 6,344,068 B1 * | 2/2002 | Fleming .................. C22B 11/04 423/24 |
| 6,350,420 B1 | 2/2002 | Duyvesteyn et al. |
| 6,355,175 B1 | 3/2002 | Green et al. |
| 6,368,381 B1 | 4/2002 | King et al. |
| 6,451,275 B1 | 9/2002 | Fleming |
| 6,500,231 B1 | 12/2002 | Wan |
| 6,602,319 B1 | 8/2003 | Murthy et al. |
| 6,632,264 B2 | 10/2003 | Zhang et al. |
| 6,641,642 B2 | 11/2003 | Simmons et al. |
| 6,660,059 B2 * | 12/2003 | Ji .............................. C22B 3/08 75/744 |
| 7,066,983 B2 | 6/2006 | Ji et al. |
| 7,544,232 B2 | 6/2009 | Hackl et al. |
| 7,559,974 B2 | 7/2009 | Ji et al. |
| 7,572,317 B2 | 8/2009 | Choi et al. |
| 7,704,298 B2 | 4/2010 | Ji et al. |
| 7,722,840 B2 | 5/2010 | Hackl et al. |
| 8,097,227 B2 | 1/2012 | Ji et al. |
| 8,273,237 B2 | 9/2012 | Marsden et al. |
| 8,597,399 B2 * | 12/2013 | Ji .............................. C22B 3/08 75/744 |
| 8,715,389 B2 * | 5/2014 | Choi ......................... C22B 3/12 75/744 |
| 8,821,613 B2 | 9/2014 | Ji et al. |
| 9,051,625 B2 | 6/2015 | Choi et al. |
| 9,790,572 B2 | 10/2017 | Choi et al. |
| 2002/0092377 A1 | 7/2002 | Ji et al. |
| 2003/0154822 A1 | 8/2003 | Hall et al. |
| 2004/0258588 A1 | 12/2004 | Buseth et al. |
| 2005/0066774 A1 | 3/2005 | Asano et al. |
| 2007/0056909 A1 | 3/2007 | Zontov |
| 2008/0105088 A1 | 5/2008 | Ji et al. |
| 2009/0056500 A1 | 3/2009 | Mendes |
| 2009/0071296 A1 | 3/2009 | Hillier et al. |
| 2010/0058893 A1 | 3/2010 | Zontov |
| 2011/0011216 A1 | 1/2011 | Jeffrey |
| 2011/0030508 A1 | 2/2011 | Dreisinger et al. |
| 2014/0047954 A1 | 2/2014 | Ji et al. |
| 2014/0356225 A1 | 12/2014 | Choi et al. |

FOREIGN PATENT DOCUMENTS

| | | |
|---|---|---|
| AU | 1852599 | 9/1999 |
| AU | 752203 | 9/2002 |
| AU | 760740 | 5/2003 |
| AU | 783904 | 12/2005 |
| CA | 2209559 | 1/1998 |
| CA | 2315480 | 2/2001 |
| CA | 2412352 | 5/2004 |
| CA | 2698578 | 7/2014 |
| CL | 1215-93 | 1/1995 |
| CL | 38972 | 9/1995 |
| CL | 1019-00 | 4/2001 |
| CL | 0759-01 | 12/2001 |
| CL | 45360 | 6/2009 |
| CL | 1163-01 | 4/2014 |
| CL | 1620-14 | 11/2014 |
| CL | 52952 | 8/2016 |
| EP | 316094 | 5/1989 |
| EP | 522978 | 1/1993 |
| EP | 1433860 | 6/2004 |
| EP | 3004407 | 4/2016 |
| GB | 1378052 | 12/1974 |
| GB | 1423342 | 2/1976 |
| GB | 2180829 | 4/1987 |
| GB | 2310424 | 8/1997 |
| JP | 60208434 | 10/1985 |

(56) References Cited

FOREIGN PATENT DOCUMENTS

| | | |
|---|---|---|
| JP | 61127833 | 6/1986 |
| JP | 61127834 | 6/1986 |
| RO | 81261 | 2/1983 |
| RU | 2268316 | 1/2006 |
| SU | 1279954 | 12/1986 |
| SU | 1284942 | 1/1987 |
| WO | WO 90/15887 | 12/1990 |
| WO | WO 91/11539 | 8/1991 |
| WO | WO 94/06944 | 3/1994 |
| WO | WO 95/04164 | 2/1995 |
| WO | WO 97/49474 | 12/1997 |
| WO | WO 99/13116 | 3/1999 |
| WO | WO 01/23626 | 4/2001 |
| WO | WO 01/36333 | 5/2001 |
| WO | WO 01/42519 | 6/2001 |
| WO | WO 01/88212 | 11/2001 |
| WO | WO 02/27045 | 4/2002 |
| WO | WO 03060172 | 7/2003 |
| WO | WO 2003/080879 | 10/2003 |
| WO | WO 2004/005556 | 1/2004 |
| WO | WO 2005/017215 | 2/2005 |
| ZA | 770840 | 1/1978 |

OTHER PUBLICATIONS

Official Action for Dominican Patent Application No. P2015-0280, dated Sep. 21, 2018, 4 pages.
Official Action for Eurasian Patent Application No. 201501141, received Nov. 19, 2018, 5 pages.
Notice of Allowance for European Patent Application No. 11846831.3, dated Aug. 13, 2018, 27 pages.
Notice of Allowance for Canada Patent Application No. 2,863,875, dated Jun. 14, 2018, 1 page.
Official Action (English translation only) for Brazilian Patent Application No. BR112013032149-0, dated Sep. 10, 2018, 4 pages.
Notice of Allowance for Japanese Patent Application No. 2014-516019 dated Jul. 3, 2018, 3 pages.
Notice of Allowance for U.S. Appl. No. 14/287,889, dated Jul, 20, 2018, 8 pages.
Feng et al., "The Role of Oxygen in Thiosulphate Leaching of Gold," Hydrometallurgy, 2007, vol. 85, pp. 193-202.
Official Action (with English translation) for Eurasian Patent Application No. 2015 01 143, dated Feb. 13, 2018, 4 pages.
Official Action for European Patent Application No. 11846831.3, dated Feb. 2, 2018, 3 pages.
Extended European Search Report for European Patent Application No. 17193704.8, dated Mar. 8, 2018, 7 pages.
Official Action (no translation available) for Japanese Patent Application No. 2014-516019, dated Feb. 15, 2018, 5 pages.
Official Action for Australia Patent Application No. 2014272803, dated Oct. 25, 2017, pages.
Notice of Acceptance for Australian Patent Application No. 2014272803, dated Apr. 6, 2018, 3 pages.
Examiner's Report for Canadian Patent Application No. 2,915,269, dated Dec. 28, 2017, 3 pages.
Office Action (no translation available) for Chilean Patent Application No. 201503410, dated Sep. 21, 2017, 9 pages.
Office Action (no translation available) for Chilean Patent Application No. 201503410, dated Mar. 23, 2018, 8 pages.
Intent to Grant for European Patent Application No. 14803553.8, dated Mar. 6, 2018, 27 pages.
U.S. Appl. No. 15/726,091, filed Oct. 5, 2017, Choi et al.
U.S. Appl. No. 15/729,961, filed Oct. 11, 2017, Choi et al.
Abbruzzese et al., "Nuove Prospettive Per II Recupero Dell'oro Dai Mineralia: La Lisciviazione Con Tiosolfata"; l'industria rnineraria, No. 4, 1994; pp. 10-14.
Abbruzzese et al., "Thiosulphate Leaching for Gold Hydrometallurgy", Hydrometallurgy 39, 1995, pp. 265-276.
Ablimt et al., "Study on Intensified Leaching of Gold with Thiosulfate", Zingjiang Res Inst of Chemistry, PRC, vol. 20 (1), 1999, pp. 39-41.

Adams, "The chemical behaviour of cyanide in the extraction of gold. 2. Mechanisms of cyanide loss in the carbon-in-pulp process," J. South African Inst. Mining & Metallurgy, 1990, vol. 90(3), pp. 67-73.
Adams et al., "Characterization and Blinding of Carbonaceous Preg-Robbers in Gold Ores", Minerals Engineering, Pregamon Press, Oxford, Great Britain, vol. 11 No. 10, Oct. 1998, pp. 919-927.
Agadzhanyan et al., "Kinetics of Ion Exchange in Selective Systems. II. Kinetics of the Exchange of Differently charged Ions in a Macroporous ion Exchanger", Published in the Russian Journal of Physical Chemistry, 61(7), 1987, pp. 994-997.
Anderson, et al., "Leaching of Antimony From a Refractory Precious Metals Concentrate," Hydrometallurgy: Fundamentals, technology and innovations, Society for Mining, Metallurgy and Exploration, 1993, pp. 341-363.
Anzhang, Mao et al., "One-Step Leaching of Some Refractory Gold Concentrate Containing Arsenic and Theory Analysis," J. Cent. South Univ. Technol., vol. 4, No. 2 (Nov. 1997).
Atluri et al., "Recovery of Gold and Silver from Ammoniacal Thiosulfate Solutions Containing Copper by Resin ion Exchange Method" A Thesis Submitted to the Faculty of the Department of Materials Science and Engineering at the University of Arizona, 1987, 219 pages.
Atluri et al., "Recovery of Silver from Ammoniacal Thiosulfate Solutions", Published in Proceedings of a Symposium on Precious and Rare Metals held in Albuquerque, NM, Apr. 6-8, 1988, pp. 290-305.
Awadalla et al., "Recovery of Gold from Thiourea, Thiocyanate, or Thiosulfate Solutions by Reduction-Precipitation with a Stabilized Form of Sodium Borohydride", published in Separation Science and Technology, 26(9), 1991, pp. 1207-1228.
Aylmore et al., "Thermodynamic Analysis of Gold Leaching by Ammoniacal Thiosulfate Using Eh/pH Speciation Diagrams", Minerals & Metallurgical Processing, vol. 16, No. 4, Nov. 2001, pp. 221-227.
Bagdasaryan, "A Study of Gold and Silver . . . " Izvestiia Vysshikh Uchebnykh Zavedenii Tsvetnaia Metallurgiia, vol. 5, 1983, pp. 64-68.
Balasanian, Ion et al., "Modeling A Process for Sodium Thiosulfate Production from Sulfite and Sulfur," Revista de Chimie, vol. 26, No. 6 (1975), pp. 475-479.
Bartels, "Chemical Abstract Index Compilation for Thiosalts and Related Compounds", Report dated Nov. 1978, A1-A17, pp. 1-5.
Bartlett, "Metal Extraction from Ores by Heap Leaching"; Metallurgical and Materials Transactions B; vol. 28B, Aug. 1997: pp. 529-545.
Benedetti, Marc and Boulegue, "Mechanism of Gold Transfer and Deposition in a Supergene Environment", Geochimica Et Cosmochirnica Acta, vol. 55, 1991, pp. 1539-1547.
Bennet et al., "A Comprehensive Copper Stockpile Leach Model: Background and Model Formulation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 315-328.
Berezowsky et al., "Recovery of Gold and Silver from Oxidation Leach Residues by Ammoniacal Thiosulphate Leaching", Paper presented at the 108.sup.th AIME Annual Meeting, New Orleans, Louisiana, Feb. 18-22, 1979, pp. 1-18.
Bhaduri, "Lixiviation of Refractory Ores with Diethylamine or Ammonium Thiosulfate", A thesis submitted in partial fulfillment of the requirements for the degree of Master of Science in Metallurgical Engineering, Aug. 1987, University of Nevada, Reno, 98 pages.
Bhakta, P., "Ammonium Thiosulfate Heap Leaching" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 259-267.
Bhakta, P., "Measurement and Application of Bioxidation Kinetics for Heaps" Hydrometallurgy 2003—Fifth International Conference

(56) References Cited

OTHER PUBLICATIONS in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 269-273.

Bhappu, R B, "Status of Non-Cyanide Heap Leaching and Other Cyanide Substitutes", Session Papers: American Mining Congress, Apr. 24-28, 1988, Chicago, vol. 1, pp. 275-287.

Black et al., "Towards an Understanding of Copper (I) Speciation and Reactivity in the Copper-Ammonia-Thiosulfate Lixiviant System", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 183-194.

Block-Bolten et al., "Gold and Silver Extraction from Complex Sulfide Wastes", Recycle and Secondary Recovery of Metals: Proceedings of the Int'l. Symposium on Recycle and Secondary Recovery of Metals and the Fall Extractive and Process Metallurgy Meeting: 1985, pp. 715-726.

Block-Bolten et al., "New Possibilities in the Extraction of Gold and Silver from Zinc and Lead Sulfide Flotation Wastes", TMS-AIME Fall Extractive Meeting, 1985, held in San Diego, CA, pp. 149-166.

Block-Bolten et al., "Thiosulfate Leaching of Gold from Sulfide Wastes", Metall. 40, Hahrgang, Heft 7, Jul. 1986, pp. 687-689.

Bouffard et al., "Mathematical Modeling of Pyritic Refractory Gold Ore Heap Biooxidation: Model Development and Isothermal Column Simulations", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 275-288.

Bourge, "Thiosulfate may replace cyanide in leaching", American Metal Market, 107(40) Mar. 2, 1999, 1 page.

Breuer et al. "A Review of the Chemistry, Electrochemistry and Kinetics of the Gold Thiosulfate Leaching Process" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 139-154.

Breuer et al., "An Electrochemical Study of Gold Oxidation in Solutions Containing Thiosulfate, Ammonia and Copper", Electrochemistry in Mineral and Metal Processing V, The Electrochemical Society, 2000, pp. 195-205.

Breuer et al., "Thiosulfate Leaching Kinetics of Gold in the Presence of Copper and Ammonia", Minerals Engineering, vol. 15, No. 10-11, 2000 Present at Hydromet 100, Adelaide, Australia, Apr. 2000, pp. 1071-1081.

Breuer et al., Fundamental Aspects of the Gold Thiosulfate leaching Process, to be presented at TMS Meeting, Feb. 2001, 16 pages.

Briones et al., "The Leaching of Silver Sulfide with the Thiosulfate—Ammonia—Cupric Ion System", Hydrometallurgy 20, 1998, pp. 243-260.

Brown et al., "Alternative Copper (II) Catalysts for Gold Leaching: Use of Multidentate Ligands to Control THiosulfate Oxidation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 213-226.

Byerley et al., "Activation of Copper (II) Ammine Complexes by Molecular Oxygen for the Oxidation of Thiosulfate Ions", journal of Chemical Society: Dalton transactions, 1975, pp. 1329-1338.

Byerley et al., "Kinetics and Mechanism of the Oxidation of Thiosulphate Ions by Copper—(ii) Ions in Aqueous Ammonia Solution." Journal of the Chemical Society, Dalton Transactions, 1973, Issue 8, pp. 889-8934.

Byerley et al., "The Oxidation of Thiosulfate in Aqueous Ammonia by Copper (II) Oxygen Complexes", Inorg. Nucl. Chem. Letters, vol. 9, 1973, pp. 879-883.

Calistru, C. et al., "Modelling of the Production of Sodium Thiosulfate From Sulfite and Sulfur," Revista de Chimie, vol. 25, No. 3 (1974), pp. 197-200.

Caney, D.J., "Thiosulfate shows leach promise—U.S. government study shows costs about the same as cyanide," American Metal Market, vol. 102, No. 196 (Oct. 11, 1994), 1 page.

Chanda et al., "Ion-Exchange Sorption of Thiosulfate and Tetrathionate on Protonated Poly (4-Vinyl Pyridine)", Reactive Polymers, 2, 1984, pp. 269-278.

Chandra et al., "Can A Thiosulfate Leaching Process Be Developed Which Does Not Require Copper and Ammonia", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 169-182.

Changlin et al., "Leaching Gold by Low Concentration Thiosulfate Solution", Published in Transactions of NFsoc, vol. 2, No. 4, Nov. 1992, pp. 21-25.

Chen et al, "Electrochemistry of Gold Leaching with Thiosulfate (I) Behaviour and Mechanism of Anodic Dissolution of Gold", J. Cent. South Inst. Min. Metall. vol. 24, No. 1, Apr. 1993 (Published in Chinese), pp. 169-173.

Chen, Yougang et al., "Production of Sodium Thiosulfate From Reduced Waste Liquor Containing Sodium Sulfide," Chemical World, vol. 31, No. 3 (1990), pp. 130-132.

Coetzee et al. "Counter-current vs co-current flow in carbon-in-pulp adsorption circuits," Minerals Engineering, Apr. 1999, vol. 12, No. 4, pp. 415-422.

Cosano, J.S. et al., "Methods for Online Monitoring to be Implemented in an Ammonium Thiosulfate Production Plant," Analytica Chimica Acta, vol. 308, No. 1-3 (1995), pp. 187-196.

Costa, Hydrometallurgy of Gold: New Perspectives and Treatment of Refractory Sulphide Ores, Fizykochemiczne Problemy Mineralurgii, 1997, vol. 31, pp. 63-72.

Danehy, James P. et al., "Iodometric Method for the Determination of Dithionite, Bisulfite, and Thiosulfate in the Presence of Each Other and Its Use in Following the Decomposition of Aqueous Solutions of Sodium Dithionite," Analytical Chemistry, vol. 46, No. 3 (1974), pp. 391-395.

Das, Tomi Nath et al., "Reduction Potentials of SO3.Bul-, SO5.Bul.-, and S4O6.Bul.3-Radicals in Aqueous Solution," The Journal of Physical Chemistry, vol. 103, No. 18 (1999), pp. 3581-3588.

de Jong et al., "Polythionate Degradation by Tetrathionate Hydrolase of Thiobacillus Ferrooxidans", Mirobiology (1997), 143, pp. 499-504.

Deschenes et al., "Cyanidation of a pyrrhotite-bearing old ore," European J. Mineral Processing & Environmental Protection, 2003, vol. 3(3), pp. 353-361.

Dhawale, "Thiosulfate—An Interesting Sulfur Oxoanion That Is Useful in Both Medicine and Industry—But Is Implicated in Corrision", Journal of Chemical Education, vol. 70, No. 1, Jan. 1993, pp. 12-14.

Dixon, D., "Heap Leach Modeling—The Current State of the Art", Hydrometallurgy 2003—Fifth International Conference in Honor of Professor Ian Ritchie—vol. 1: Leaching and Solution Purification, Edited by C.A. Young, A.M. Aliantazi, C.G. Anderson, D.B. Dreisinger, B. Harris and a. James TMS (The Minerals, Metals & Materials Society), 2003, pp. 289-314.

Ege, Guenes N. et al,, "PVP—A Practical Stabilizer for Technetium-99M-Sulfur Colloid," Journal of Nuclear Medicine, vol. 11, No. 4 (1970), pp. 175-176.

Feng et al., "Elution of Ion Exchange Resins by Use of Ultrasonication", Hydrometallurgy, 55 (2000), pp. 201-212.

Feng, D. et al., "Galvanic Interactions Between Sulphides and Manganese Dioxide in Thiosulphate Leaching of Gold Ores," Department of Chemical Engineering, The University of Melbourne, Victoria, 2001, pp. 1-39.

(56) References Cited

OTHER PUBLICATIONS

Ferron et al., "Thiosulphate Leaching of Gold and Silver Ores: An Old Process Revisited", Presented at 100.sup.th CIM Annual General Meeting, held in Montreal, Quebec, Canada May 3-7, 1998, 63 pages.

Ficeriov et al., "Cyanideless Methods of Leaching of the Gold and Silver Concentrate Coming from Hodrusa After Pretreatment by Ultrafine Grinding", Mineralia Slovaca, vol. 31 No. 3-4, 1999, pp. 363-368.

Ficeriova et al., "Thiosulfate leaching of gold from a mechanically activated CuPbZn concentrate," Hydrometallurgy, 2002, vol. 57(1-3), pp. 37-43.

Filho et al., "Contribuica Ao Estudo Da Dissoluca Do Ouro Pelo Tiossulfato", 49.sup.th International Congress on the Technology of Metals and Materials held in Sao Paulo Brazil, Mineral Technology, vol. IV, Oct. 1994, pp. 265-279.

Fleming et al., "Recent Advances in the Development of an Alternative to the Cyanidation Process—Based on Thiosulphate Leaching and Resin In Pulp", Paper presented at Ballarat, Nov. 2000, 27 pages.

Flett et al., "Chemical Study of Thiosulphate Leaching of Silver Sulphide", Trans. Instn. Min. Metall. 92, Dec. 1983, pp. C216-C223.

Foss et al., "Displacement of Sulphite Groups of Polythionates by Thiosulphate", Acta Chem. Scand. 15, 1961 No. 1, pp. 1608-1611.

Gadalla Ahrned M. et al., "Characterization of the Product of the Thiosulfate Process for Desulfurization of Flue Gases," Industrial & Engineering Chemistry Research, vol. 33, No. 5 (1994), pp. 1145-1149.

Gallagher et al., "Affinity of Activated Carbon Towards Some Gold (I) Complexes", Hydrometallurgy, 15, 1990, pp. 305-316.

Gallagher, "Interaction of Gold Cyanide, Thiocyanate, Thiosulfate, and Thiourea Complexes with Carbon Matrices", A thesis submitted in partial fulfillment of the requirements for the degree of Master of Science in Metallurgical Engineering, May 1987, University of Nevada, Reno, 194 pages.

Gelves et al., "Recovering of Refractory Gold Using Ammonium Thiosulfate Solutions", Clean Technology for the Mining Industry, Proceeding of the III International Conference on Clean Technologies for the Mining Industry held in Santiago, Chile, May 15-17, 1996, pp. 477-487.

Goldhaber, "Experimental Study of Metastable Sulfur Oxyanion Formation During Pyrite Oxidation at pH 6-9 and 30.degree. C", American Journal of Science, vol. 283, Mar. 1983, pp. 193-217.

Groudev et al., "Extraction of Gold and Silver from Oxide Ores by Means of a Combined Biological and Chemical Leaching", Biohydrometallurgical Technologies: Proceedings of an International Biohydrometallurgy Symposium, held in Jackson Hole, Wyoming, Aug. 22-25, 1993, pp. 417-425.

Groudev et al., "Pilot Scale Microbial Leaching of Gold and Silver from an Oxide in Eishitza Mine, Bulgaria", Mineral Bioprocessing II: Proceedings of the Engineering Foundation Conference Minerals Processing II, held in Snowbird, Utah, Jul. 10-15, 1995, pp. 35-144.

Groudev et al., "Two-Stage Microbial Leaching of a Refractory Gold-Bearing Pyrite Ore", Minerals Engineering, vol. 9, No. 7, 1996, pp. 707-713.

Groudev, et al., "A Combined Chemical and Biological Heap Leaching of an Oxide Gold-Bearing Ore", Physicochemical Problems of Mineral Processing, 33, pp. 55-61 1999.

Guerra et al., "A Study of the Factors Affecting copper Cementation of Gold from Arnmoniacal Thiosulphate Solution", Hydrometallurgy 51 (1999), pp. 155-172.

Guerra, "A Study of the Factors Affecting Copper Cementation of Gold from Ammoniacal Thiosulphate Solution", A Thesis submitted in partial fulfillment of the requirements for the Degree of Master of Applied Science in the faculty of graduate studies, Nov. 1997, pp. 1-74.

Gundiler et al., "Thiosulphate leaching of Gold from Copper-Bearing Ores", Presented at the SME annual Meeting held in Reno, Nevada, Feb. 15-18, 1993, 13 pages.

Han et al., "Factors Influencing the Rate of Dissolution of Gold in Ammoniacal Solutions", Int. J. Miner. Process. 58, 2000, pp. 369-381.

Hemmati et al., "Study of the Thiosulphate Leaching of Gold from Carbonaceous Ore and the Quantitative Determination of Thiosulphate in the Leached Solutions", Papers presented at the Extraction'89 symposium, organized by The Institution of Mining and Metallurgy and held in London, from Jul. 10-13, 1989, pp. 665-678.

Hemmati, "A Study of the Thiosulfate Leaching of Gold from Carbonaceous Ore and the Quantitative Determination of Thiosulfate in the Leached Solution", A thesis submitted in partial fulfillment of the requirements for the degree of Master of Science in Metallurgical Engineering, Apr. 1987, University of Nevada, Reno, 19 pages.

Hiskey, J. Brent et al., "Dissolution Chemistry of Gold and Silver in Different Lixiviants," Mineral Processing and Extractive Metallurgy Review, vol. 4, Dec. 1988, pp. 95-134.

Hitchen et al., "A Review of Analytical Methods for the Determination of Polythionates, Thiosulphate, Sulphite and Sulphide in Mining Effluents", Report dated Aug. 1976, pp. 1-23.

Hitchen, "Preparation of Potassium Tetrathionate and Potassium Trithionate for Studies of the Thiosalt Problem in Mining Effluents", Report dated Oct. 1976, pp. 1-5.

Huang et al., "Theory and Practice of Leaching Gold by Thiosulfate", South Inst of Metallurgy PRC, vol. 19(9):1998, pp. 34-36.

Idriss et al., "A New Method for the Macro-and Microdetermination of Tri-and Tetrathionate", Can. J. Chem., col. 55, 1977, pp. 3887-3893.

Jacobson, R.H. et al., "Gold Solution Mining," Proceedings of a Symposium on Precious and Rare Metals, Albuquerque, NM, Apr. 6/8, 1988, pp. 157-174.

Jagushte et al., "Insight Into Spent Caustic Treatment: On Wet Oxidation of Thiosulfte to Sulfate", J. Chem Technol, Biotechnol, 74 (1999), pp. 437-444.

Jeffrey et al., "Ion exchange adsorptionand elution for recovering gold thosulfate from leach solutions," Hydrometallurgy, 2010, vol. 100(3-4), pp. 136-143.

Jeffrey et al., "The quantificationof thiosullate and polythionates in gold leach solutions and on anion exhange resins," Hydrometallurgy, 2007, vol. 89(1-2), pp. 52-60.

Ji et al., "A Novel THiosulfate System for Leaching Gold Without The Use of Copper and Ammonium", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 227-244.

Ji et al., Research and Optimization of Thiosulfate leaching Techology of Gold, published in Rare Metals (A Chinese Journal of Science, Technology & Applications in the Field of Rare Metals), vol. 10, No. 4, Oct. 1991, pp. 275-280.

Jia, Xueshun et al., "Reductive Cleavage of S-S Bond by Samarium Diiodide: A Novel Method for the Synthesis of Disulfides," Synthetic Communications, vol. 24, No. 20 (1994), pp. 2893-2898.

Jian et al., "Leaching Gold and Silver by Lime-Sulphur-Synthetic-Solution (LSSS)", Xian Inst. Metall. Constr. Eng., vol. 16, 1992, pp. 389-393.

Jiang et al., "A Kinetic Study of Gold Leaching with Thiosulfate", Hydrometallurgy, Fundamentals, Technology and Innovations, AIME, Chapter 7, 1993, pp. 119-126.

Jiang et al., "Anodic Oxidation of Thiosulfate Ions in Gold Leaching", J. Cent. South Univ. Technol., vol. 4, No. 2, Nov. 1997, pp. 89-91.

Jiang et al. "Electrochemistry and Mechanism of Leaching Gold with Ammoniacal Thiosulphate", The Australasian Institute of Mining and Metallurgy Publication Series No. 3/93, vol. 5 Gold Processing, Hydrometallurgy and Dewatering and Miscellaneous, pp. 1141-1146 1993.

Jiang et al., "Gold and Silver Extraction by Ammoniacal Thiosulfate Catalytical Leaching at Ambient Temperature", Proceedings of the first International Conferences on Modern Process Mineralogy and Mineral Processing held in Beijing, China, Sep. 22-25, 1992, pp. 648-653.

(56) References Cited

OTHER PUBLICATIONS

Jiang et al., "Regularities of Thiosulfate Consumption and Leaching of Copper-Bearing Gold Ore", Mining and Metallurgical Engineering, vol. 16, No. 1, Mar. 1996, pp. 46-48.
Jiang et al., "Self-Catalytic Leaching of Gold . . . ", Nonferrous Metals, vol. 44(2), 1992, pp. 30-39.
Jiexue et al., "Recovery of Gold from Thiosulfate Solution", Engineering Chemistry and Metallurgy, vol. 10, No. 2, May 1989, pp. 45-50.
Jiexue et al., "Substitution of Sulfite with Sulfate in the Process of Extracting Gold by Thiosulfate Solution", Engineering Chemistry & Metallurgy, vol. 12, No. 4, Nov. 1991, pp. 302-305.
Johnson, et al., "Chemical Mining—A Study of Leaching Agents" New Mexico Bureau of Mines and Mineral Resources (1969), pp. 1-10.
Johnston et al., "Rates of Sulfur Production in Acid Thiosulfate Solutions Using Sulfur-35," Journal of Colloid and Interface Science, vol. 42, No. 1 (1973), pp. 112-119.
Kaczmarek, Tadeusz et al., "Chrystalline Sodium Thiosulfate Production in a Pilot Plant," Przemysl Chemiczny, vol. 64, No. 12 (1985), pp. 593-596.
Kaczmarek, Tadeusz et al.; "Up-To-Date Method of Chrystalline Sodium Thiosulfate Production," Przemysl Chemiczny, vol. 64, No. 9 (1985), pp. 431-434.
Kametani, Hiroshi et al.; "Separation and Identification of Sulfate," Journal of Mining and Metallurgical, vol. 103 (1987), pp. 799-804.
Kelly; "Oxidation of Thiosulphate During Chromatography in the Presence of Copper of Gold Ions"; Journal of Chromatography; col. 66,(1)J., 1972; pp. 185-188.
Kim et al., "Extraction of Gold from a Gold Ore by Ammonium Thiosulphate Leaching", J of the Korean Inst. of Metals, vol. 28, No. 12 (1990), pp. 1048-1053.
Koh et al., "Spectrophotometric Determination of Total Amounts of Polythionates (tetra-, Penta-, and Hexathionate) in Mixtures with Thiosulfate and Sulfite", Analytical Chemistry, vol. 45, Oct. 12, 1973, pp. 2018-2022.
Koh, et al.; "The Determination of Micro Amounts of Polythionates," Anal. Chin. Acta, vol. 61, Dec. 1972, pp. 451-460.
Kononova et al., "Sorption Recoveryj of Gold from Thiosulphate Solutions After Leaching of Products of Chemical Preparation of Hard Concentrates", Hydrometallurgy vol. 59, Jan. 2001, pp. 115-123.
Kravetz, "Cyanide Destruction Using Catalyzed Thiosulfates," Cherokee Chemical Engineering Company, Inc., 2000, 4 pages.
Kucha et al., Gold-Pyrite Association-Results of Oxysulphide and Polysulphide Transport of Gold, Trans. Instn. Min. Metall. (Sect. B: Appl. Earth Sci.) 103, Sep.-Dec. 1994.
Lam et al., "The Importance of the CU (II) Catalyst in The THiosulfate Leaching of Gold" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 195-211.
Lan et al., "Recovery of Gold by Thiosulfate and LSSS", Proceedings of the twenty-first International Precious Metals Conference held in San Francisco, California, 1997, p. 185.
Langhans et al., "Copper-Catalyzed Thiosulfate Leaching of Low-Grade Gold Ores", Hydrometallurgy, 29, 1992, pp. 191-203.
Langhans et al., "Gold Extraction from Low Grade Carbonaceous Ore Using Thiosulfate", Practical Aspects of International Management and Processing, SME, 1996, pp. 85-94.
Levenson et al., "The Stability of Concentrated Thiosulphate solutions at High Temperature. Part II. The Loss of the Sulphite", The Journal of Photographic Science, vol. 13, 1965, pp. 79-81.
Li et al., "Copper Catalyzed Ammoniacal Thiosulfate Leaching of Gold and Silver—Solution Chemistry", 1995, 34 pages.
Li et al., "Important Solution Chemistry Factors That Influence the Copper-Catalyzed Ammonium Thiosulfate Leaching of Gold", Presented at the 125.sup.th SME Annual Meeting held in Pheonix, Arizona, Mar. 11-14, 1996, pp. 1-20.
Li et al., "Leaching Gold with Thiosulphate Solution Containing Added Sodium Chloride and Sodium Dodecyl Sulphonate" Engineering Chemistry & Metallurgy, vol. 19, No. 1, Feb. 1998, pp. 76-82.
Li et al., "Studies on a United Non-Toxic Process to Recover Au/Cu from Complex Gold Ores Bearing Copper", Journal of Xiangtan Mining Institute, vol. 14, No. 2, 1999, pp. 50-54.
Li et al., "The Ammoniacal Thiosulfate System for Precious Metal Recovery", Published in the Proceedings of the XIX International Mineral Processing Congress, Precious Metals Processing and Mineral Waste and the Environment, vol. 4, 1995, Chapter 7, pp. 37-42.
Lukomskaya, "Extraction of Copper Gold and Silver from Tailings by Thiosulfate Heap Leaching.", Tsvetnye Metally, No. 4, Apr. 4, 1999, p. 48-49.
Makhija et al., "Determination of Polythionates and Thiosulphate in Mining Effluents and Mill Circuit Solutions", Talanta, vol. 25, 1978, pp. 79-84.
Makhija et al., "The Titrimetric Determination of Sulphate, Thiosulphate and Polythionates in Mining Effluents", Report dated Feb. 1978, pp. 1-14.
Makhija, "The Determination of Polythionates and Thiosulphate in Mining Effluents and Mill Circuit Samples," Mineral Sciences Laboratories Report MRP/MSL 76-361 (TR) (Dec. 1976), pp. 1-9.
Marcus, "The Anion Exchange of Metal Complexes—The Silver—Thiosulphate System", Published in the ACTA Chemica Scandinavica 11 (1957), pp. 619-627.
McPartland et al., "Concentration and Reduction of Au(I) Thiosulfate to Metallic Gold", Metal Separation Technologies Beyond 2000: Integrating Novel Chemistry with Processing. ed. By K.C. Liddell and D.J. Chaiko, TMS, 1999, pp. 105-115.
McPartland et al., "Leaching of precious Metal Ores Using Thiosulfate", Metal Separation Technologies Beyond 2000: Integrating Novel Chemistry with Processing, ed. By K.C. Liddell and D.J. Chaiko, TMS, 1999, pp. 93-103.
Meyer et al., "Raman Spectrometric Study of the Thermal Decomposition of Aqueous Tri- and Tetrathionate", Phosphorus and Sulfur, vol. 14, 1982, pp. 23-36.
Michel et al., "Integration of Amino Acids in the Thiosulfate Gold Leaching Process", Randal Gld & Silver Forum, 1999, pp. 99-103.
Michel, Didier et al., "Electrochemical Investigation of the Thiosulfate Gold Leaching Process," presented at CIM Gold Symposium, Montreal 98, May 1998, 12 pages.
Mizoguchi et al., "The Chemical Behavior of Low Valence Sulfur Compounds.X. .sup.1) Disproportionation of Thiosulfate, Trithionate, Tetrathionate and Sulfite Under Acidic Conditions", Bulletin of the Chemical Society of Japan, vol. 49(1), 1976, pp. 70-75.
Molleman, et al., "The Treatment of Copper-Gold Ores by Ammonium Thiosulfate Leaching", Hydrometallurgy, Elsevier Science, vol. 66 No. 1-3, Oct. 2002, pp. 1-21.
Murthy et al., "Leaching of Gold and Silver from Miller Process Dross Through Non-Cyanide Leachants", Hydrometallurgy 42, 1996, pp. 27-33.
Murthy, "Some Studies on the Extraction of Gold and Silver from Lead-Zinc Sulphide Flotation Tailings through Non-Cyanide Leachants", Trans. Indian inst. Met. vol. 44, No. 5, Oct. 1991, pp. 349-354.
Naito et al., "The Chemical Behavior of Low Valence Sulfur Compounds. III. Production of Ammonium Sulfamate by the Oxidation of Ammonium Thiosulfate", Bulletin of the Chemical Society of Japan, vol. 43, 1970, pp. 1365-1372.
Naito et al., "The Chemical Behavior of Low Valence Sulfur Compounds. V. Decomposition and Oxidation of Terathionate in Aqueous Ammonia Solution", Bulletin of the Chemical Society of Japan, vol. 43, 1970, pp. 1372-1376.
Naito et al., "The Reactions of Polythionates Kinetics of the Cleavage of Trithionate Ion in Aqueous Solutions", J. inorg. Nucl. Chem., vol. 37, 1975, pp. 1453-1457.
Nicol et al., "Recovery of Gold From Thiosulfate Solutions and Pulps With Ion-Exchange Resins", presented at TMS Annual Meeting, New Orleans, LA Feb. 11-15, 2001.

(56) References Cited

OTHER PUBLICATIONS

Niinae et al., "Preferential Leaching of Cobalt, Nickel and Copper from Cobalt-rich Feromanganese Crusts with Ammoniacal Solutions using Ammonium Thiosulfate and Ammonium Sulfite as Reducing Agent", Hydrometallurgy, vol. 40, 1996, pp. 111-121.
No Author, "And So Does a Novel Lixiviant", Chemical Engineering, vol. 102(3), Mar. 1995, p. 25.
No Author, "Gold Extraction Method Offers Companies an Alternative to Cyanide", JOM: The Journal of the Minerals, Metals & Materials Society, vol. 46(11), Nov. 1994, p. 4.
Nord et al., "The Oxidation of Thiosulfate by the Tetramminegold (III) ion in Aqueous Solution", Acta Chemica Scandinavica A 29, 1975, pp. 505-512.
Ofori-Sarpong et al., "Myco-hydrornetallurgy: coal model for potential reduction of preg-robbing capacity of carbonaceous gold ores using the fungus, Phanerochaete chrysosporiurn," Hydrometallurgy, 2010, vol. 102, pp. 66-72, abstract only.
O'Malley, "Recovery of Gold from Thiosulfate Solutions and Pulps with Anion-Exchange Resins," PhD thesis, Murdoch University, 2002, 284 pages.
Osaka et al., Electrodeposition of Soft Gold from a Thiosulfate-Sulfite Bath for Electronics Appications, J. Electrochem. Soc., vol. 144, No. 10, Oct. 1997, pp. 3462-3469.
Panayotov, "A Technology for Thiosulphate Leaching of Au and Ag from Pyrite Concentrates", Changing Scopes in Mineral Processing: proceedings of the 6.sup.th International Mineral Processing Symposium, Kusadasi, Turkey, Sep. 24-26, 1996, pp. 563-565.
Pedraza et al., "Electro-Oxidation of Thiosulphate Ion on Gold-study by means of Cyclic Voltammetry and Auger Electron Spectroscopy", J. Electroanal. Chem., 250, 1988, pp. 443-449.
Pyke et al., "The Characterisation and Behaviour of Carbonaceous Material in a Refractory Gold Bearing Ore," 1999, vol. 99, pp. 851-862.
Qian et al., "Kinetics of Gold Leaching from Sulfide Gold Concentrates with Thiosulfate Solution", Transaction of Nfsoc vol. 3, No. 4, Nov. 1993, pp. 30-36.
Qian et al., "Treatment of sulphide Gold Concentrate Containing Copper with Thiosulfate Solution" (published in Chinese), Engineering Chemist, vol. Iss, 11,May 2, 1990, pp. 145-151.
Qian et al., "Treatment of Sulphide Gold Concentrate Containing Copper with Thiosulfate Solution", Proceedings of Randol Gold Conference, Sacramento 1989, pp. 131-135.
Rolia et al., "Oxidation of Thiosalts with Hydrogen Peroxide", Report dated May 1984, pp. 1-26.
Rolia et al., "The Kinetics of Decomposition of Tetrathionate, Trithionate and Thiosulphate in Alkaline Media", Report dated Mar. 1981, pp. 1-34.
Rolia et al., The Oxidation of Thiosulphate by Hydrogen Peroxide in Alkaline Solution, Report dated Jul. 1984, pp. 1-14.
Rolia, et al., "Effect of pH and Retention Time on the Degradation of Thiosalts," CANMET Mineral Sciences Laboratories Report MRP/MSL 79-8 (TR) (Jan. 1979), pp. 1-16.
Rolia, et al., "Oxidation of Thiosalts by S02 Plus Air, Charcoal Plus Air, and Chlorine," CANMET Mineral Sciences Laboratories Report MRP/MSL 79-85 (TR) (Jun. 1979), pp. 8-12.
Rolia, "Kinetics of Decomposition of Tetrathionate, Trithionate and Thiosulfate in Alkaline Media", Environ. Sci. Technol. 1982, 16, pp. 852-857.
Rolia, "The Kinetics of Decomposition of Tetrathionate, Trithionate and Thiosulphate in Alkaline Solution", A Thesis submitted to the School of Graduate Studies in partial fulfillment of the requirements for the Degree of Master of Science Carleton University, Sep. 1981, pp. 1-170.
Rolia, "The Kinetics of Decomposition of Thiosalts by Metallic Iron", Report dated Jun. 1981, pp. 1-19.
Rolia; "The Oxidation of Thiosalts in Strongly Alkaline Media"; Report dated Nov. 1981; p. 28.

Rong Yu Wan et al., "Research and Development Activities for the Recovery of Gold from Noncyanide Solutions," Hydrometallurgy Fundamentals, Technology and Innovation (J.B. Hisky & G.W. Warren, Eds. 1993) pp. 415-436.
Schippers et al., "Bacterial Leaching of Metal Sulfides Proceeds by Two Indirect Mechanisms via Thiosulfate or via Polysulfides and Sulfur," Applied and Environmental Microbiology (Jan. 1999) pp. 319-321.
Schmitz, P. A., "Ammoniacal thiosulfate and sodium cyanide leaching of preg-robbing Goldstrike ore carbonaceous matter," Elsevier, Hydrometallurygy 60 (2001) pp. 25-40, 2001.
Senanayake et al., Thermodynamic Studies of the Gold (III) (I)/(0) Redox System in Ammonia—Thiosulphate Solutions at 25° C., Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 155-168.
Siu et al., "Kinetics of Reaction of Sulfide with Thiosulfate in Aqueous Solution", Ind. Eng. Chem. Res., 1999, 38, pp. 1306-1309.
Smith et al., "Aqueous Solution Chemistry of Polythionates and Thiosulphate: A Review of Formation and Degradation Pathways", Mineral Sciences Laboratories Report MRP/MSL 76-223 (LS), Canmet, Aug. 1976, pp. 1-29.
Steudel et al., "The Molecular Nature of the Hydrophilic Sulfur Prepared from Aqueous Sulfide and Sulfite (Selmi Sulfur Sol)", Z. Naturforsch. Bc, 1989, 44:4, pp. 526-530.
Steudel et al., "The Moledular Composition of Hydrophilic Sulfur Sols Prepared by Acid Decomposition of Thiosulfate," Zeitschrift Fur Naturforschung, vol. 43, No. 2 (1988), pp. 203-218.
Subramanian et al. (1980) 'Reverse Osmosis Separation of Thiosalts from Mining Effluents', Separation Science and Technology, 15: 5, 1205-1211.
Sullivan et al., "The Autocatalytic Deposition of Gold in Nonalkaline, Gold Thiosulfate Electroless Batch", J. Electrochem. Soc., vol. 142, No. 7, Jul. 1995, pp. 2250-2255.
Ter-Arakelyan et al., "Technological Expediency of Sodium Thiosulphate for the Extraction of Gold from Ores", Soviety Non-Ferrous Metals Research, vol. 12, No. 5, 1984, pp. 393-397.
Ter-Arakelyan, et al., "Sodium Thiosulfate an Extraction of", Izvestiia Vysshikh Uchebnykh Zaedenii, Tsvetnaia Metallurgiia, vol. Iss 5, 1984, pp. 72-76.
Tozawa et al., "Dissolution of Gold in Ammoniacal Thiosulfate Solution", Metallurgical Society AIME, 1981, pp. 1-12 and cover.
Tykodi, "In Praise of Thiosulfate", Journal of Chemical Education, 1990, vol. 68, pp. 146-149.
Umetsu et al., "Dissolution of Gold in Ammoniacal Sodium Thiosulfate Solution", AIME World Lead-Zinc Symposium, vol. II, 1970, pp. 97-104.
Vandeputte et al., "Influence of the Sodium Nitrate Content on the Rate of the Electrodeposition of Silver from Thiosulphate Solutions", Electrochirnica Acta. vol, 42, Nos. 23-24, 1997, pp. 3429-3441.
von Michaelis et al., "The Prospects for Alternative Leach Reagents-Can Precious metals Producers Get Along With Cyanide?", Engineering and Mining Journal, Jun. 1987, pp. 42-47.
Wan et al., "Thiosulfate Leaching Following Biooxidation Pretreatment for Gold Recovery from Refractory Carbonaceous-Sulfidic Ore", Mining Engineering, Aug. 1997, pp. 76-80.
Wan R.Y. et al., "Solution Chemistry Factors for Gold Thiosulfate Heap Leaching," International Jounral of Mineral Processing, (Jul. 1, 2003), pp. 311-322.
Wan, "Importance of Solution Chemistry for Thiosulphate Leaching of Gold", Presented at the World Gold '97 Conference in Singapore, Sep. 1-3, 1997, pp. 159-162.
Wang et al., "A Novel Gold Electroplating System: Gold (I)-Iodide-Thiosulfate", J. Electrochem. Soc., vol. 145, No. 3, Mar. 1998.
Wang, "Thermodynamic Equilibrium Calculations on Au/Ag-Lixiviant Systems Relevant to Gold Extraction from complex Ores", Proceedings of the Third International Symposium on Electrochemistry in Mineral and Metal Processing III, 1992, pp. 452-477.

(56) References Cited

OTHER PUBLICATIONS

Webster, "Thiosulphate Complexing in Gold and Silver During the Oxidation of a Sulphide-Bearing Carbonate Lode System, Upper Ridges Mine, P.N.G.", The Aus. I.M.M. Perth and Kaigoorlie Branches, Region conference on Gold-Mining Metallurgy and Geology, Oct. 1984, pp. 437-445.
Wenge et al., "Studies on Leaching Gold and Silver from Gold Concentrates and Silver Pyrites Associated with Complex Metals Sulphides by Ammoniacal Thiosulfate" (published in Chinese), Non Ferrous Metals, vol. 39, No. 4, Nov. 1987, pp. 71-76.
Wentzien et al., "Thiosulfate and Tetrathionate Degradation as well as Biofilm Generation by Thiobacillus Intermedius and Thiobacillus Versutus Studied by Microcalorirnetry, HPLC, and Ion-pair Chromatography", Arch Microbiol. 161, 1994, pp. 116-125.
West-Sells et al., "A Process for Counteracting the Detrimental Effect of Tetrathionate on Resin Gold Adsorption From Thiosulfate Leachates", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 245-256.
Yang et al., "Leaching Gold from Refractory Gold Ore Bearing Arsenic by Thiosulfate Process", Journal of Yunnan University, 19:5, 1997, pp. 508-514.
Yang, Ming et al., "Application of Catalytic Oxidation to PR," Guangxi Chemical Industry, vol. 28 (1999), pp, 18-19, 25.
Yen et al., "Development in Percolation Leaching with Ammonium Thiosulfate for Gold Extraction of a Mild Refractory Ore", EPD Congress 1999, The Minerals & Materials Society, 1999, Paper at the TMS, Mar. 1-3, 1999, held in San Diego, California, pp. 441-455.
Yen et al., "Gold Extraction from Mildly Refractory Ore Using Ammonium Thiosulphate", International Symposium of Gold Recovery, May 4-7, 1998, Montreal, Quebec, Canada.
Yokosuka et al., "Chemical Behaviour of Low-Valent Sulfur Compounds XII Oxidation of Sodium Thiosulfate with Hydrogen Peroxide and Sodium Hypochlorite", Journal of the Japan Chemistry Society, 11, 1975, pp. 1901-1909.
Zhang "Oxidation of Refractory gold Concentrates and Simultaneous Dissolution of Gold in Aerated Alkaline Solutions", Thesis, Murdock University, Australia, Mar. 2004, 358 pages.
Zhang et al., "Gold Extraction by Ammoniacal Thiosulfate Leaching from the Roasted Copper-Bearing Sulphureous Gold Concentrate", Huangjin Bianjibu, PRC, vol. 20 (7), 1999, pp. 32-35.
Zhao et al., "Extraction of gold from thiosulfate solutions using amine mixed with neutral donor reagents", Hydrometallurgy 48, 1998, pp. 133-144.
Zhao et al., "Extraction of gold from thiosulfate solutions with alkyl phosphorus esters", Hydrometallurgy 46 (1997) pp. 363-372.
Zhao et al., "Gold Extraction from Thiosulfate Solutions Using Mixed Amines", Solvent Extraction and Ion Exchange, 16(6), 1998, pp. 1407-1420.
Zhu et al., "Electrochemical Studies on the Mechanism of Gold Dissolution in Thiosulfate Solutions", Transactions of NFsoc, vol. 4, No. 1, 1991, pp. 50-53.
Zhu et al., "Oxidation Kinetics of Thiosulfate and Polysulfide Mixture", Engineering Chemistry & Metallurgy, vol. 17, No. 1, 1996, pp. 26-31.
Zhu, Guocai et al.' "Leaching of Gold from Sulfide Concentrates with Thiosulfate/Polysulfide Produced by Disproportionation of Elemental Sulfur in Ammoniacal Media," Papers Presented at the International Symposium Hydrometallurgy '94, pp. 541-546.
Zhuchkov et al., "Copper Sulfide Dissolution Kinetics in Thio . . . ", Izvestiia Vysshikh Uchebnykh Zavedenii Tsvetnaia Metallurgiia, vol. Iss 5-6, 1992, pp. 56-62.
Zilberman et al., "Decomposition of polythionates", Russian Journal of Inorganic Chemistry, vol. 14, No. 8, 1969, pp. 1203-1204.
Zipperian et al., "Gold and Silver Extraction by Ammoniacal Thiosulfate Leaching from a Ryolite Ore", Hydrometallurgy, vol. 19, 1988 pp. 361-375.
Australian Patent Office Examiner's First Report on Australian Patent Application No. 18525/99, dated Sep. 26, 2001, 2 pages.
Canadian Patent Office First Office Action on Canadian Patent Application No. 2,278,044, dated Sep. 21, 2006, 2 pages.
Official Action for Argentine Patent Application No. P060102243, received Jun. 17, 2012, 1 page.
Translation of Official Action for Argentine Patent Application No. P060102244, received Jun. 8, 2012, 1 page.
Official Action for Chile Patent Application No. 1163-2001, dated Apr. 29, 2011, 7 pages.
Official Action with mechanical English translation for Chile Patent Application No. 1163/2001, dated Feb. 13, 2012, 6 pages.
Official Action for Chile Patent Application No. 1615/2014, dated Feb. 29, 2016 9 pages No translation.
Official Action for Chile Patent Application No. 1615/2014, dated Feb. 6, 2017 8 pages No translation.
Official Action for Chile Patent Application No. 2014-001620, dated Feb. 9, 2016 8 pages No translation.
Official Action for Chile Patent Application No. 2014-001620, dated Feb. 6, 2017 7 pages No translation.
Peruvian Patent Office Technical Report No. LPC 46/2004, 12 pages.
Search Report for International (PCT) Patent Application No. PCT/IB01/01119, dated Jul. 2, 2002, 8 pages.
Written Opinion for International (PCT) Patent Application No. PCT/IB01/01119, dated Nov. 6, 2002, 2 pages.
International Preliminary Examination Report for International (PCT) Patent Application No. PCT/IB01/01119, dated Jan. 10, 2003, 22 pages.
Examiner's First Report for Australian Application No. 2001274393 dated Apr. 18, 2005, 2 pages.
Examiner's Report No. 2 for Australian Application No. 2001274393 dated Mar. 27, 2006, 2 pages.
Examiner's Report No. 3 for Australian Application No. 2001274393 dated Apr. 28, 2006, 2 pages.
Examiner's Report No. 4 for Australian Application No. 2001274393 dated Jul. 25, 2006, 2 pages.
Australian Patent Office Examiner's Report No. 2 on Australian Patent Application No. 2006/200966, dated Dec. 14, 2006, 2 pages.
Australian Patent Office Examiner's First Report on Australian Patent Application No. 2006/200967, dated Jul. 4, 2006, 2 pages.
Office Action for Canadian Patent Application No. 2,409,378, dated Jan. 26, 2007.
Office Action for Canadian Patent Application No. 2,409,378, dated May 22, 2008.
Notice of Allowance for Canadian Patent Application No. 2,409,378, dated Aug. 10, 2009.
Office Action for Canadian Patent Application No. 2,620,644, dated Oct. 14, 2008.
Notice of Allowance for Canadian Patent Application No. 2,620,644, dated Jul. 14, 2009.
Office Action for Canadian Patent Application No. 2,617,457, dated Oct. 14, 2008.
Official Action for Canadian Patent Application No. 2,617,457, dated Jul. 9, 2010.
Office Action for Canadian Patent Application No. 2,617,457, dated Jul. 10, 2009.
Notice of Allowance for Canada Patent Application No. 2,617,457, dated Feb. 18, 2011 1 page.
Office Action for Canadian Patent Application No. 2,617,415, dated May 28, 2008.
Notice of Allowance for Canadian Patent Application No. 2,617,415, dated Jul. 14, 2009, 3 pages.
Notice of Allowance for Canada Patent Application No. 2,664,756, dated Mar. 28, 2012 1 page.
Official Action for Canadian Patent Application No. 2,664,756, dated May 14, 2010, 3 pages.
Official Action for Canada Patent Application No. 2664756, dated Feb. 15, 2011, 2 pages.
Official Action for Canadian Patent Application No. 2,698,578, dated Nov. 23, 2010, 3 pages.
Official Action for Canada Patent Application No. 2,698,578, dated Jan. 26, 2012 2 pages.

(56) References Cited

OTHER PUBLICATIONS

Official Action for Canadian Patent Application No. 2,698,578, dated Feb. 4, 2013, 2 pages.
Notice of Allowance for Canadian Patent Application No. 2,698,578, dated Nov. 7, 2013, 1 page.
Official Action for Canadian Patent Application No. 2,745,806, dated Nov. 29, 2012, 3 pages.
Official Action for Canadian Patent Application No. 2,745,806, dated Nov. 4, 2013, 2 pages.
Official Action for Canadian Patent Application No. 2,745,806, dated Apr. 30, 2014, 2 pages.
Official Action for Canadian Patent Application No. 2,745,928, dated Nov. 28, 2012, 3 pages.
Notice of Allowance for Canada Patent Application No. 2,745,933, dated Oct. 12, 2011, 1 page.
Official Action for Canada Patent Application No. 2,756,715, dated Apr. 29, 2013, 2 pages.
Notice of Allowance for Canada Patent Application No. 2,756,715, dated Mar. 18, 2014 1 pages.
Office Action for Canada Patent Application No. 2,864,359, dated Dec. 12, 2014, 3 pages.
Office Action for Canada Patent Application No. 2,864,359, dated Oct. 26, 2015, 1 pages.
UK Patent Office Examination Report on UK Patent Application No. 0226199.8, dated Nov. 12, 2003, 5 pages.
UK Patent Office Further Examination Report on UK Patent Application No. 0226199.8, dated May 21, 2004, 3 pages.
UK Patent Office Further Examination Report on UK Patent Application No. 0226199.8, dated Aug. 9, 2004, 3 pages.
UK Patent Office Further Examination Report on UK Patent Application No. 0226199.8, dated Sep. 21, 2004, 2 pages.
Official Action for Mexico Patent Application No. MX/a/2007/010084, dated Aug. 5, 2011 2 pages.
Office Action for Canadian Patent Application No. 2,424,714, dated Jan. 26, 2009.
Office Action for Canadian Patent Application No. 2,424,714, dated Sep. 14, 2009, 3 pages.
Notice of Allowance for Canadian Patent Application No. 2,424,714, dated Jul. 8, 2010, 1 page.
Official Action for Argentine Patent Application No. P030104232, date unknown, 1 page.
Translation of Report Previous to Final Decision for Argentine Patent Application No. P030104232, date unknown, 1 page.
Office Action for Canadian Patent Application No. 2,449,467, dated Sep. 13, 2007, 3 pages.
Office Action for Canadian Patent Application No. 2,449,467, dated Jan. 28, 2009, 2 pages.
Notice of Allowance for Canadian Patent Application No. 2,449,467, dated Sep. 14, 2009, 1 page.
Official Action for Canada Patent Application No. 2,691,607, dated Aug. 8, 2011 3 pages.
Office Action for Canadian Patent Application No. 2,691,607, dated Apr. 4, 2013, 3 pages.
Notice of Allowance for Canadian Patent Application No. 2,691,607, dated Mar. 19, 2014, 1 page.
Office Action for Canadian Patent Application No. 2,850,217, dated Jun. 1, 2016, 4 pages.
Office Action for Canadian Patent Application No. 2,850,216, dated Nov. 14, 2014, 3 pages.
Examination Report for Chilean Patent Application No. 2361/2003, dated May 7, 2007, 9 pages.
International Search Report for counterpart PCT application PCT/IB 03/06475 dated Jun. 30, 2006, 10 pages.
Written Opinion for counterpart PCT application PCT/IB 03/06475 dated Oct. 19, 2006, 2 pages.
International Preliminary Examination Report for counterpart PCT application PCT/IB 03/06475 dated Dec. 13, 2006., 3 pages.
Substantive Examination Report for ARIPO Patent Application No. AP/P/2005/003335, dated Aug. 18, 2008, 4 pages.

Examination Report and Form No. 21 for ARIPO Patent Application No. AP/P/2005/003335, dated Jan. 29, 2009, 4 pages.
Notice of Allowance for African Regional Intellectual Property Organization (ARIPO) Patent Application No. AP/P/2009/004750, dated Jul. 23, 2012 5 pages.
Notice of Acceptance for Australian Patent Application No. 2003302110, dated Sep. 19, 2007, 1 page.
Examiner's Report for Australian Patent Application No. 2007211912, dated Dec. 7, 2007.
Notice of Acceptance for Australian Patent Application No. 2007211912, dated Jan. 16, 2008, 1 page.
Office Action for Canadian Patent Application No. 2,505,740, dated Jun. 4, 2008, 4 pages.
Office Action for Canadian Patent Application No. 2,505,740, dated Jul. 16, 2009, 1 page.
Notice of Allowance for Canadian Patent Application No. 2,505,740, dated Apr. 6, 2010.
Official Action for Canada Patent Application No. 2,716,442, dated Jul. 5, 2011 4 pages.
Official Action for Canada Patent Application No. 2,716,442, dated Apr. 3, 2012 3 pages.
Notice of Allowance for Canadian Patent Application No. 2,716,442 dated Feb. 19, 2013, 1 page.
UK Patent Office Examination Report on UK Patent Application No. GB0509741.5, dated Dec. 22, 2005, 6 pages.
UK Search and Examination Report (GB 0509741.5), dated Apr. 13, 2006, in co-pending related application, 12 pages.
UK Patent Office Examination Report on UK Patent Application No. GB0509741.5, dated Oct. 4, 2006.
UK Patent Office Combined Search and Examination Report on UK Patent Application No. GB0612107.3, dated Oct. 4, 2006, 5 pages.
UK Patent Office Combined Search and Examination Report on UK Patent Application No. GB0612108.1, dated Oct. 4, 2006, 4 pages.
UK Patent Office Search and Examination Report on UK Patent Application No. GB0612108.1, dated Mar. 5, 2007, 3 pages.
International Search Report and Written Opinion for International (PCT) Patent Application No. PCT/IB2011/003096, dated May 2, 2012 7 pages.
International Preliminary Report on Patentability for International (PCT) Patent Application No. PCT/IB2011/003096, dated Jun. 20, 2013 5 pages.
Notice of Acceptance for ARIPO Patent Application No. AP/P/2013/006961, dated Sep. 2, 2015 5 pages.
Notice of Acceptance for Australian Patent Application No. 2011340196, dated Nov. 25, 2015, 2 pages.
Official Action for Australian Patent Application No. 2016200323, dated Sep. 15, 2016, 3 pages.
Official Action for Australian Patent Application No. 2016200323, dated May 26, 2017, 4 pages.
Official Action for Australian Patent Application No. 2016200323, dated Jul. 19, 2017, 5 pages.
Notice of Allowance for Australian Patent Application No. 2016200323, dated Aug. 22, 2017, 3 pages.
Official Action for Canada Patent Application No. 2,820,700, dated Oct. 23, 2014, 2 page.
Notice of Allowance for Canada Patent Application No. 2,820,700, dated Mar. 19, 2015 1 page.
Official Action for Canada Patent Application No. 2,863,875, dated Dec. 21, 2016 3 pages.
Official Action for Canada Patent Application No. 2,863,875, dated Sep. 14, 2017 4 pages.
Official Action for Chile Patent Application No. 1619-2013, dated Apr. 30, 2015 8 pages.
Notice of Allowance for Chile Patent Application No. 1619-2013, dated May 26, 2016 1 page.
Official Action (with English translation) for Eurasian Patent Application No. 2015 01 143, dated Aug. 16, 2017 4 pages.
Extended Search Report for European Patent Application No. 11846831.3, dated Aug. 14, 2015 5 pages.
Official Action for European Patent Application No. 11846831.3, dated Dec. 22, 2016 3 pages.
Official Action for European Patent Application No. 11846831.3, dated Sep. 19, 2017 3 pages.

(56) References Cited

OTHER PUBLICATIONS

Official Action for Indonesia Patent Application No. P00 2014 04613 dated Sep. 8, 2014, 2 pages.
Official Action for Indonesia Patent Application No. PP00 2014 04613 dated Jul. 19, 2017, 6 pages.
Office Action (with English summary) for Mexican Patent Application No. MX/a/2013/006124, dated Jul. 28, 2016, 10 pages.
Notice of Allowance for Mexican Patent Application No. MX/a/2013/006124, dated May 12, 2017, 1 page.
Notice of Acceptance for New Zealand Patent Application No. 611643 dated Jun. 5, 2014, 2 pages.
Official Action for New Zealand Patent Application No. 623104 dated Apr. 7, 2014, 2 pages.
Official Action for Philippines Patent Application No. 1-2013-501134 dated Sep. 3, 2014, 1 page.
Official Action for Philippines Patent Application No. 1-2013-501134 dated Oct. 1, 2014, 1 page.
Official Action for Philippines Patent Application No. 1-2014-502431 dated Aug. 31, 2016, 3 pages.
Official Action for Philippines Patent Application No. 1-2014-502431 dated Jul. 6, 2017, 2 pages.
International Search Report for International Patent Application No. PCT/US12/42615 dated Aug. 31, 2012, 4 pages.
Written Opinion for International Patent Application No. PCT/US12/42615 dated Aug. 31, 2012, 4 pages.
International Preliminary Report on Patentability for International Patent Application No. PCT/US12/42615 dated May 31, 2013, 4 pages.
Official Action for Canadian Patent Application No. 2,838,901, dated Mar. 11, 2015 4 pages.
Official Action for Eurasian Patent Application No. 201400021, dated Feb. 3, 2016 4 pages.
Official Action for Eurasian Patent Application No. 201400021, dated Aug, 31, 2016 4 pages.
Extended European Search Report for European Patent Application No. 12800341.5, dated May 19, 2015, 7 pages.
Official Action (with English translation) for Japanese Patent Application No. 2014-516019, dated May 24, 2016 5 pages.
International Search Report and Written Opinion for International (PCT) Patent Application No. PCT/IB2014/001378, dated Oct. 14, 2014 9 pages.
International Preliminary Report on Patentability for International (PCT) Patent Application No. PCT/IB2014/001378, dated Dec. 10, 2015 7 pages.
Examiner's Report for Canadian Patent Application No. 2,915,269, dated Oct. 14, 2016, 4 pages.
Notice of Allowance for Canadian Patent Application No. 2,915,269, dated Jun. 2, 2017, 1 page.
Official Action for Eurasian Patent Application No. 201501141, dated Aug. 11, 2017, 2 pages.
Extended European Search Report for European Patent Application No. 14803553.8, dated Jan. 31, 2017, 9 pages.
Office Action for U.S. Appl. No. 10/446,548 dated Jul. 7, 200, 6 pages.
Office Action for U.S. Appl. No. 10/446,548 dated Dec. 28, 2004, 7 pages.
Office Action for U.S. Appl. No. 10/446,548 dated Jun. 10, 2005, 8 pages.
Office Action for U.S. Appl. No. 11/927,170, dated Jun. 20, 2008, 12 pages.
Office Action for U.S. Appl. No. 11/927,170, dated Dec. 10, 2008, 19 pages.
Notice of Allowance for U.S. Appl. No. 11/927,170, dated Mar. 6, 2009, 13 pages.
Office Action for U.S. Appl. No. 10/836,480 dated Oct. 14, 2005, 17 pages.
Office Action for U.S. Appl. No. 10/836,480 dated Apr. 3, 2006, 6 pages.
Office Action for U.S. Appl. No. 10/836,480 dated Mar. 23, 2007, 11 pages.
Office Action for U.S. Appl. No. 10/836,480 dated Aug. 27, 2007, 12 pages.
Office Action for U.S. Appl. No. 10/836,480 dated Dec. 28, 2007, 8 pages.
Office Action for U.S. Appl. No. 10/836,480 dated Jul. 9, 2008, 9 pages.
Office Action for U.S. Appl. No. 10/836,480 dated Dec. 24, 2008, 21 pages.
Notice of Allowance for U.S. Appl. No. 10/836,480 dated Oct. 7, 2009, 9 pages.
Office Action for U.S. Appl. No. 12/700,525, dated Jun. 18, 2010, 6 pages (Restriction Requirement).
Office Action for U.S. Appl. No. 12/700,525 dated Sep. 17, 2010, 12 pages.
Official Action for U.S. Appl. No. 12/700,525, dated Mar. 17, 2011, 20 pages.
Official Action for U.S. Appl. No. 12/700,525, dated Aug. 21, 2013 23 pages.
Official Action for U.S. Appl. No. 12/700,525, dated Jan. 6, 2014, 9 pages.
Notice of Allowance for U.S. Appl. No. 12/700,525, dated Apr. 15, 2014, 9 pages.
Official Action for U.S. Appl. No. 13/020,505, dated Jan. 17, 2012 5 pages Restriction Requirement.
Official Action for U.S. Appl. No. 13/020,505, dated Apr. 23, 2012 10 pages.
Official Action for U.S. Appl. No. 13/020,505, dated Nov. 30, 2012 10 pages.
Notice of Allowance for U.S. Appl. No. 13/020,505, dated Jul. 9, 2013 9 pages.
Official Action for U.S. Appl. No. 14/058,915, dated Jan. 13, 2016 14 pages.
Final Action for U.S. Appl. No. 14/058,915, dated Apr. 28, 2016 10 pages.
Official Action for U.S. Appl. No. 14/058,915, dated Aug. 15, 2016 9 pages.
Final Action for U.S. Appl. No. 14/058,915, dated Nov. 30, 2016 7 pages.
Office Action for U.S. Appl. No. 10/713,640 dated Jul. 28, 2006.
Office Action for U.S. Appl. No. 10/713,640, dated Dec. 31, 2007, 6 pages.
Office Action for U.S. Appl. No. 10/713,640, dated Dec. 3, 2008, 14 pages.
Office Action for U.S. Appl. No. 10/713,640 dated May 27, 2009, 5 pages.
Notice of Allowance for U.S. Appl. No. 10/713,640 dated Dec. 23, 2009, 9 pages.
Office Action for U.S. Appl. No. 11/613,056 dated Feb. 22, 2008, 25 pages.
Office Action for U.S. Appl. No. 11/616,056 dated Aug. 22, 2008, 15 pages.
Notice of Allowance for U.S. Appl. No. 11/613,056 dated Feb. 10, 2009, 12 pages.
Notice of Allowance for U.S. Appl. No. 11/613,056 dated Apr. 10, 2009, 2 pages.
Office Action for U.S. Appl. No. 12/683,967, dated Aug. 31, 2010, 6 pages.
Office Action (Restriction Requirement) for U.S. Appl. No. 12/683,967, dated Feb. 11, 2011, 6 pages.
Official Action for U.S. Appl. No. 12/683,967, dated May 19, 2011 6 pages.
Notice of Allowance for U.S. Appl. No. 12/683,967, dated Sep. 15, 2011 5 pages.
Official Action for U.S. Appl. No. 13/313,594, dated Apr. 5, 2013 5 pages Restriction Requirement.
Official Action for U.S. Appl. No. 13/313,594, dated Jun. 27, 2013 8 pages.
Notice of Allowance for U.S. Appl. No. 13/313,594, dated Nov. 26, 2013 15 pages.
Official Action for U.S. Appl. No. 13/958,683, dated Oct. 7, 2015 5 pages Restriction Requirement.
Official Action for U.S. Appl. No. 13/958,683, dated Nov. 5, 2015 11 pages.

(56) References Cited

OTHER PUBLICATIONS

Official Action for U.S. Appl. No. 13/958,683, dated Feb. 25, 2016 13 pages.
Official Action for U.S. Appl. No. 13/958,683, dated Jun. 20, 2016 12 pages.
Official Action for U.S. Appl. No. 13/958,683, dated Dec. 14, 2016 8 pages.
Notice of Allowance for U.S. Appl. No. 13/958,683, dated May 22, 2017 10 pages.
Corrected Notice of Allowance for U.S. Appl. No. 13/958,683, dated Jun. 20, 2017 5 pages.
Official Action for U.S. Appl. No. 13/524,907, dated Sep. 25, 2014 12 pages.
Notice of Allowance for U.S. Appl. No. 13/524,907, dated Jan. 28, 2015 8 pages.
Official Action for U.S. Appl. No. 14/287,889, dated Jun. 28, 2016 21 pages.
Final Action for U.S. Appl. No. 14/287,889, dated Nov. 8, 2016 19 pages.
Official Action for U.S. Appl. No. 14/287,889, dated Mar. 3, 2017 15 pages.
Notice of Allowance for U.S. Appl. No. 14/287,889, dated Aug. 16, 2017 11 pages.
Extended European Search Report for European Patent Application No. 18155275.3, dated May 6, 2018, 7 pages.
Official Action (English translation only) for Brazilian Patent Application No. BR112013032149-0, dated May 18, 2018, 7 pages.
Official Action (with English translation) for Japanese Patent Application No. 2016-516258, dated May 29, 2018, 7 pages.
Notice of Allowance for U.S. Appl. No. 14/287,889, dated Mar. 2, 2018 5 pages.
Official Action for European Patent Application No. 18155275.3, dated Jun. 3, 2019, 4 pages.
Official Action (no English translation available) for Dominican Republic Patent Application No. P2013-0303, dated Mar. 28, 2019, 6 pages.
Notice of Allowance (no English translation available) for Dominican Republic Patent Application No. P2015-0280, dated Mar. 12, 2019, 35 pages.
Official Action for U.S. Appl. No. 15/729,961, dated Jul. 3, 2019, 9 pages.

\* cited by examiner

CO-CURRENT AND COUNTER CURRENT RESIN-IN-LEACH IN GOLD LEACHING PROCESSES

CROSS REFERENCE TO RELATED APPLICATION

The present application is a continuation application of U.S. application Ser. No. 13/958,863 with a filing date of Aug. 5, 2013, entitled "Co-Current and Counter Current Resin-In-Leach in Gold Leaching Processes", now U.S. Pat. No. 9,790,572, which is a divisional patent application of U.S. application Ser. No. 13/313,594 with a filing date of Dec. 7, 2011, entitled "Co-Current and Counter Current Resin-In-Leach in Gold Leaching Processes", which issued as U.S. Pat. No. 8,715,389 on May 6, 2014, which claims the benefits of U.S. Provisional Application Ser. No. 61/420, 596, filed Dec. 7, 2010, all entitled "Use of Co-Current and Counter Current Resin in Leach to Improve Gold Recovery in Thiosulfate Leaching" and each of which is incorporated herein by this reference in its entirety.

FIELD

The disclosure relates generally to hydrometallurgical processes for recovering gold and/or silver and particularly to hydrometallurgical processes for recovering gold.

BACKGROUND

Referring to FIG. 1, a conventional gold recovery process is depicted.

A refractory or double refractory sulfidic gold and/or silver-containing material 100 is subjected to pressure oxidation, such as in an autoclave, in step 104 to form an oxidized output slurry 108, that includes a gold and/or silver-containing residue.

The oxidized output slurry 108 is hot cured in optional step 112 to convert basic iron sulfate and free sulfuric acid to dissolved ferric sulfate and form a hot cured slurry 116.

In step 120, the hot cured slurry 116 is optionally subjected to liquid/solid separation, such as by a counter current decantation circuit, to form a washed slurry 124.

The washed slurry 124 is subjected to neutralization in step 128, typically by a weaker base such as alkali or alkaline earth metal oxides and carbonates, to neutralize most of the acid and acid equivalents in the washed slurry 124 and form neutralized slurry 132.

The neutralized slurry 132 is preconditioned in step 136 by contact with sparged air and a strong base, particularly lime, to form a preconditioned slurry 140 having a pH of about pH 8 or higher.

In step 144, the preconditioned slurry 140 is subjected to a gold and/or silver resin-in-leach process in the presence of a gold and/or silver lixiviant, such as thiosulfate, to load onto the resin the gold and/or silver in the residue. The loaded resin can be stripped and the stripped gold and/or silver recovered as a gold and/or silver product 148.

FIG. 2 depicts a conventional counter-current resin-in-leach (or resin-in-pulp) circuit 200 of the type used in step 144. The circuit 200 includes a plurality of first, second, third, . . . nth tanks 208a-n. The fresh resin 204, which is typically a strong-base anion exchange resin, is first contacted with the slurry 140 containing the lowest amount of dissolved gold, providing a driving force to promote the leaching of gold from the residue and adsorption of the dissolved gold. The gold and/or silver loaded resin 212 is removed from the first tank 208a, and barren tailings 216 are removed from the nth tank 208n.

Although this process can be effective in recovering gold and/or silver, gold and/or silver recoveries can be problematic. Use of the resin-in-leach or resin-in-pulp method is generally limited to those gold and/or silver-bearing ores or concentrates requiring mild thiosulfate leaching conditions, since strong thiosulfate leach conditions can result in competitive adsorption on the resin by polythionate anions (e.g., tetrathionate and trithionate) produced during leaching. By way of example, tetrathionate and trithionate concentrations of 420 and 350 mg/L, respectively, have been found to reduce gold loading onto a Purolite™ A500C resin by an order of magnitude; that is, from 26 to 2 kg Au/t resin from a solution containing 0.3 mg/L Au. A typical concentration of tetrathionate and other higher polythionates in a thiosulfate leach solution ranges from about 50 to about 200 mg/L and of trithionate ranges from about 275 to about 375 mg/L.

To counter this problem, sulfite has been added to pregnant thiosulfate leach solutions in an oxygen-free atmosphere (e.g., using a nitrogen purge) to counteract the detrimental effect of polythionate concentration. Although effective, this approach can add additional expense to the process.

SUMMARY

These and other needs are addressed by the various aspects, embodiments, and configurations of the present disclosure. The present disclosure is directed generally to gold and/or silver leaching using a resin-in-leach or resin-in-pulp circuit.

In a first embodiment, a method includes the step of:
leaching, by thiosulfate, a gold and/or silver-containing material in a resin-in-leach or resin-in-pulp circuit, the circuit comprising a co-current portion where the gold and/or silver-containing material and a gold and/or silver-collecting resin flow co-currently and a counter-current portion where the gold and/or silver-containing material and gold and/or silver-collecting resin flow counter-currently.

In a second embodiment, a method includes the step of:
thiosulfate leaching, by a resin-in-leach or resin-in-pulp circuit, a gold-containing material, the circuit comprising a co-current portion where the gold-containing material and an ion exchange resin flow co-currently and a counter-current portion where the gold and/or silver-containing material and ion exchange resin flow counter-currently. The solutions used to strip gold from the gold-loaded resin and to convert tetrathionate and other higher polythionates to trithionate are commonly different and the operations are done in separate steps.

In a third embodiment, a system includes:
a first set of tanks configured to flow co-currently an ion exchange resin, thiosulfate, and a gold and/or silver-containing material, the first set of tanks comprising a first input for a first inputted ion exchange resin and a first output for a first gold and/or silver-loaded resin; and
a second set of tanks for receiving the thiosulfate and gold and/or silver-containing material from the first set of tanks and being configured to flow counter-currently a second inputted ion exchange resin on the one hand and the thiosulfate and gold and/or silver-containing material on the other. The second set of tanks includes a second input for a second inputted resin and a second output for a second gold and/or silver loaded resin. The first and second inputted ion exchange resins are different from one another, and the first and second gold and/or silver-loaded resins are different from one another. In one configuration, the second gold and/or silver-loaded resin is introduced into the first input as part of the first inputted ion exchange resin.

The co-current and counter-current portions can have many configurations. In one configuration, the co-current and counter-current portions do not share a common resin-in-leach or resin-in-pulp tank. Typically, the gold and/or silver-containing material flows first through the co-current portion and second through the counter-current portion. Most (or all) of the gold and/or silver-loaded resin in the co-current portion is removed from the co-current portion and most (or all) of a gold and/or silver-loaded resin in the counter-current portion is removed from the counter-current portion. In one configuration, the co-current and counter-current portions share a common vessel. Stated another way, most (or all) of the gold and/or silver-loaded resin in the co-current portion and most (or all) of the gold and/or silver-loaded resin in the counter-current portion are removed from a common tank.

Commonly, a first resin concentration in a part of the co-current portion is greater than a second resin concentration in a part (or all) of the counter-current portion. An average and median resin concentration in the co-current portion is typically greater than a respective average and median resin concentration in the counter-current portion. Stated another way, a maximum resin concentration in the co-current portion exceeds a maximum resin concentration in the counter-current portion, and a minimum resin concentration in the co-current portion exceeds a minimum resin concentration in the counter-current portion.

However in other applications, a first resin concentration in a part of the co-current portion is less than a second resin concentration in a part (or all) of the counter-current portion. An average and median resin concentration in the co-current portion can be less than a respective average and median resin concentration in the counter-current portion. Stated another way, a maximum resin concentration in the co-current portion does not exceed a maximum resin concentration in the counter-current portion, and a minimum resin concentration in the co-current portion does not exceed a minimum resin concentration in the counter-current portion. By way of example, a first resin concentration in a first tank of the co-current portion is lower than the resin concentrations in one or more other tanks in the counter-current portion.

In many leach circuits, the thiosulfate is substantially or completely free of ammonia.

In one configuration, most (or all) of polythionate- and gold and/or silver-loaded resin from the counter-current portion is treated to convert most of the higher polythionates to trithionate using a first solution but most (or all) of the gold and/or silver remains loaded on the resin to form a treated gold and/or silver-loaded resin. In one application, pentathionate and/or other higher polythionates sorbed on the resin are treated with sulfite, which converts tetrathionate, pentathionate and other higher polythionates into trithionate and thiosulfate.

High levels of sorbed tetrathionate and other higher polythionates on the gold and/or silver-loaded resin can increase significantly tetrathionate and other higher polythionate levels in the co-current portion. Trithionate is not as strongly sorbed onto the resin as pentathionate and tetrathionate and, compared to higher polythionates, is significantly less likely to precipitate gold and/or silver from solution and inhibit gold and/or silver adsorption on the resin. The treated gold and/or silver-loaded resin is introduced into the first input of the co-current portion. The treated gold and/or silver-loaded resin is loaded with more gold and/or silver in the co-current portion to form further gold and/or silver-loaded resin, and the further gold and/or silver-loaded resin is removed from the co-current portion and subjected to gold and/or silver stripping using a second (stripping) solution to remove most (or all) of the gold and/or silver from the further gold and/or silver-loaded resin and form a gold and/or silver-stripped resin. The gold and/or silver-stripped resin can be regenerated and reintroduced into the counter-current portion. This configuration is typically employed where the adsorbed level of tetrathionate and other higher polythionates on the treated gold and/or silver-loaded resin from the counter-current portion is relatively high. For example, the configuration would be appropriate when the adsorbed polythionates are predominantly in the form of tetrathionate and other higher polythionates.

In one configuration, the gold and/or silver-loaded resin from the counter-current portion is introduced from the second output directly into the first input of the co-current portion without intermediate treatment to remove tetrathionate and other higher polythionates from the resin. This configuration is employed when the levels of adsorbed tetrathionate and other higher polythionates are relatively low. For example, the configuration would be appropriate when the adsorbed polythionates are predominantly in the form of trithionate.

In one configuration, the gold and/or silver-loaded resins from the counter-current and co-current portions are subjected to separate the resin treatment (for higher polythionate conversion) and/or gold and/or silver-stripping stages.

In one configuration, the gold and/or silver-loaded resins from the counter-current and co-current portions are subjected to common treatment and/or gold and/or silver-stripping stages.

All, some, or none of the stripped resin can be regenerated for reuse in either or both of the co-current and counter-current portions.

The present disclosure can provide a number of advantages depending on the particular configuration. The circuit can promote fast gold and/or silver adsorption kinetics from the slurry at the front end of the circuit and prevent gold and/or silver loss by preg robbing and other gold and/or silver-recovery-reducing mechanisms. By adding resin in a co-current flow to the first tank, there commonly are no interfering compounds, which reduce resin loading, from subsequent leach tanks being transferred to the tanks at the beginning of the circuit. The resin added to the first tank is normally retained in the second tank until the concentration builds up. Allowing the resin concentration to build in the second tank can substantially minimize the effects of changes in the composition of gold and/or silver-containing material. The circuit can recover gold and/or silver effectively from gold and/or silver-bearing ores or concentrates requiring not only mild but also strong thiosulfate leaching conditions. In addition, the detrimental effects of polythionate anions (e.g., tetrathionate and other higher polythionates with tetrathionate being more detrimental) on gold and/or silver recovery can be largely negated by the circuit.

These and other advantages will be apparent from the disclosure of the aspects, embodiments, and configurations contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "higher polythionate" refers to a compound comprising $S_n(SO_3)_2]^{2-}$, where n≥4. "Higher polythionates" therefore includes tetrathionate, pentathionate, hexathionate, and so on.

The term "ion exchange resin" or "ion-exchange polymer" is an insoluble matrix (or support structure) normally in the form of small (0.25-2 mm diameter) beads fabricated from an organic polymer substrate, such as crosslinked polystyrene or polystyrene-divinyl benzene copolymers. The material has a highly developed structure of pores or functional groups (such as amines and esters on the surface), which easily trap and release ions. The adsorption of ions takes place only with simultaneous releasing of other ions; thus the process is called ion exchange. Functional groups can be basic (anion exchangers) or acidic (cation exchangers), with strong- and weak-base resins being preferred.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A "polythionate" is a salt or ester of a polythionic acid.

The phrase "preg robbing carbon" refers to a carbonaceous material that preferentially absorbs, permanently or temporarily, gold and gold-thio complexes and silver and silver-thio complexes.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 4:
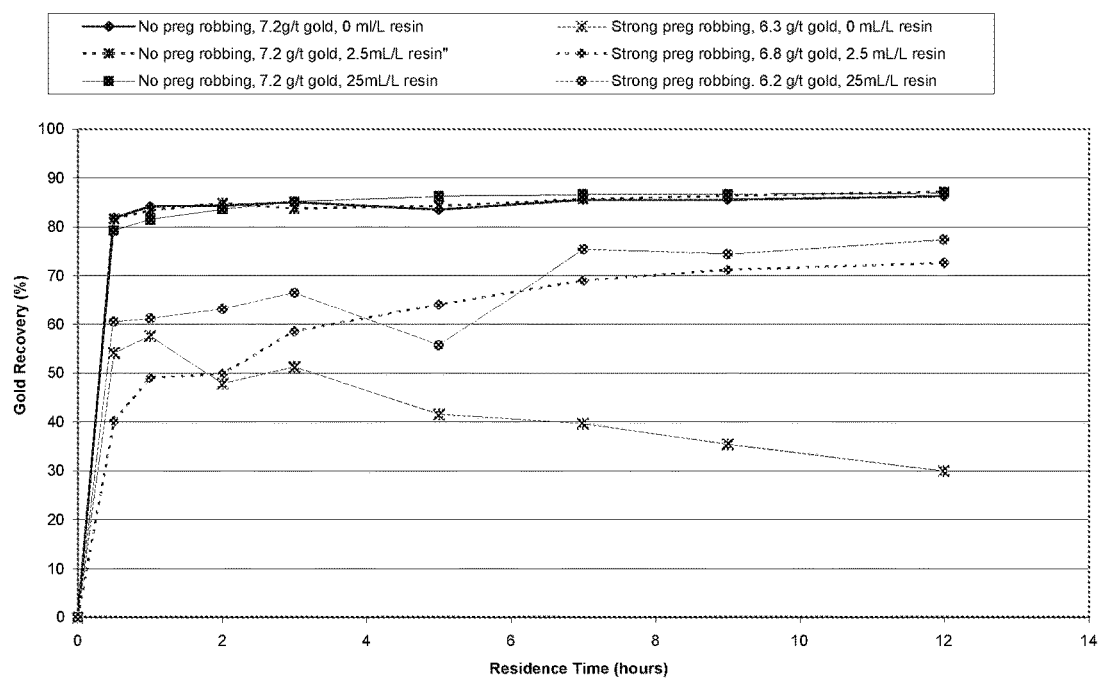
FIG. 4 is a plot of gold recovery (percent) (vertical axis) against residence time (hours) (horizontal axis)

FIG. 4 depicts phenomena that can occur when performing thiosulfate gold and/or silver leaching with and without an ion exchange resin. First, the majority of gold is commonly leached from the gold-containing material quickly. Second when the gold-containing material is substantially free of preg-robbing components, the gold is commonly leached from the material quickly and almost completely. Leaching kinetics do not appear to be affected by the presence or absence of an ion exchange resin. Third when the gold-containing material contains a preg robbing component, the leaching kinetics are commonly slower, and the initial leaching kinetics and overall gold recovery are improved when the resin is present. Finally when the gold-containing material contains a preg robbing component and the resin is not present during leaching, the initial leaching kinetics are commonly high but the gold recovery commonly decreases over time. The decrease in recovery is most likely due to the adsorption of the gold thiosulfate complex by the preg-robbing material. As shown in FIG. 4, fast adsorption of gold in solution can prevent subsequent losses in recovery by preg-robbing.

Feed to gold recovery circuits can exhibit great variability which can also adversely affect gold recovery. In addition to the effect of preg robbing shown above, gold concentration, and the presence of other metals, which can complex with thiosulfate and be adsorbed by the resin, can also affect leaching kinetics and recoveries.

Thiosulfate is partially oxidized under the conditions required for gold leaching and its oxidation products can compete with gold and/or silver thiosulfate complexes for functional group sites. The oxidation products include trithionate ($S_3O_6$), tetrathionate ($S_4O_6$), pentathionate ($S_5O_6$), other higher polythionates, and sulfate ($SO_4^{2-}$), and these oxidation products can be adsorbed by the resin. The relative affinities for various compounds adsorbed by strong base anion exchange resins are:

Gold>Mercury>Pentathionate>Tetrathionate>
    Copper>Trithionate.

Typical concentrations of polythionates in the slurry 140 range from about 0.1 to about 5 g/L and even more typically from about 0.5 to about 2 g/L.

Figure 1:
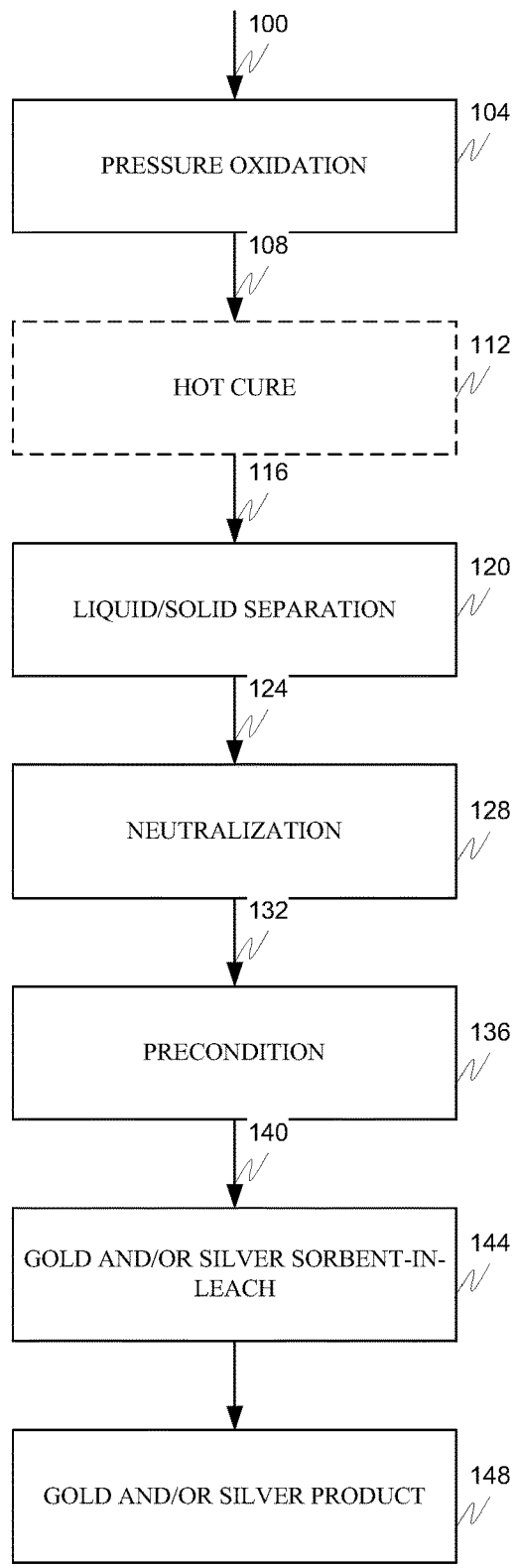
FIG. 1 is a process flow chart according to the prior art.
Figure 2:
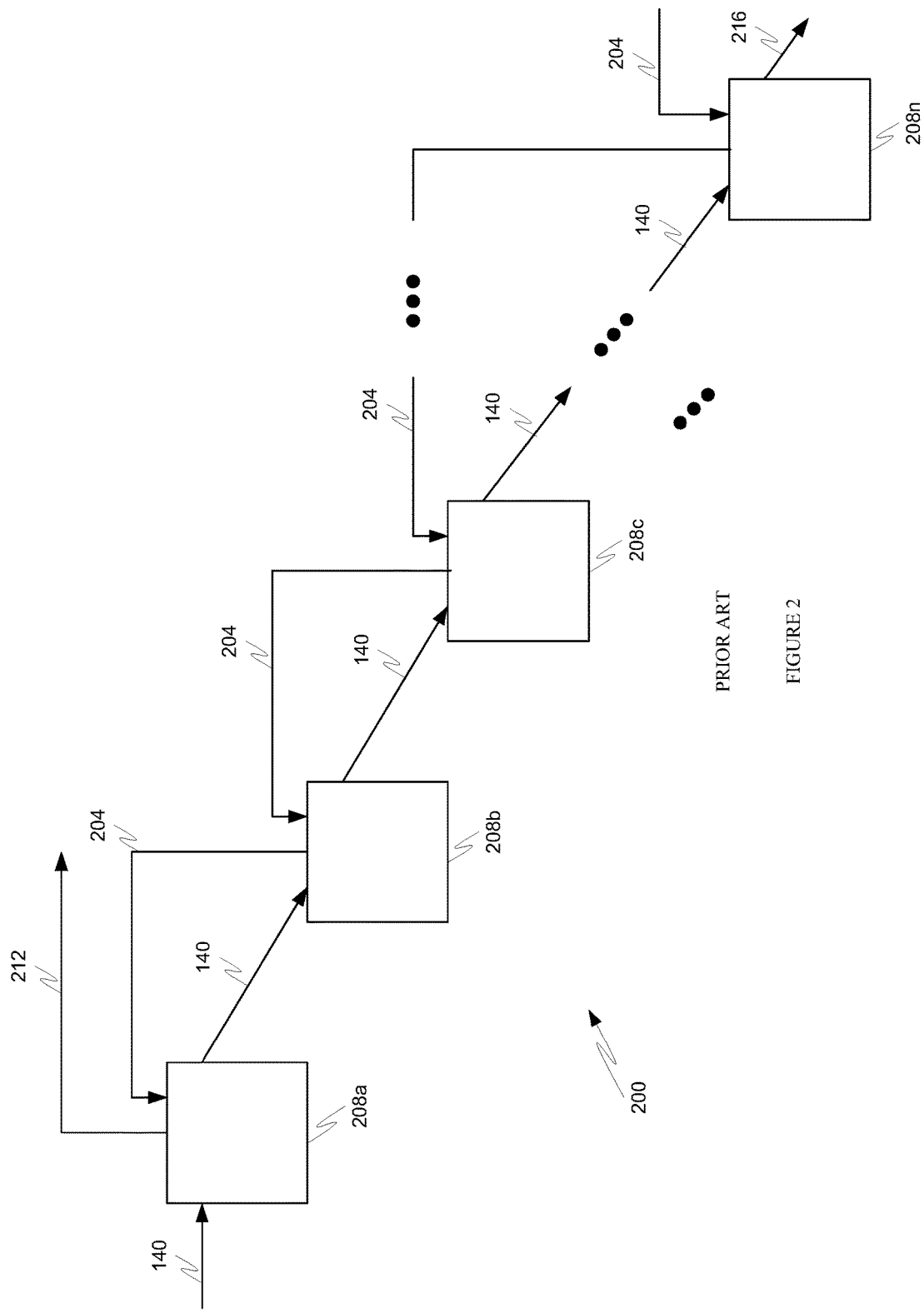
FIG. 2 is a resin-in-leach circuit according to the prior art.

With reference to the conventional circuit 200 of FIG. 2 as the resin 204 is transferred towards the slurry feed end of the circuit 200, the gold level on the resin 204 increases, however the level of other components, particularly trithionate, tetrathionate and/or other higher polythionates, which, as noted, have an affinity for the resin, will also increase. By the time the resin 204 reaches the first tank 208*a*, which is where the majority of the gold (and/or silver) thiosulfate complex is typically formed (or the majority of gold (and/or silver) is dissolved), the resin 204 may not have adequate adsorption capacity to adsorb the gold (and/or silver), thereby lowering gold recoveries.

To minimize substantially the effects of changes in feed characteristics on gold recovery, it appears, based on the results shown in FIG. 4, to be advantageous to operate a thiosulfate resin-in-leach operation employing a high concentration of resin during the earliest stages of gold leaching. This can ensure that there is an abundance of adsorption or functional sites on the resin to adsorb the gold (and/or silver) prior to preg robbing or the occurrence of other species competing with gold (and/or silver) thiosulfate complex for resin functional groups.

Figure 3:
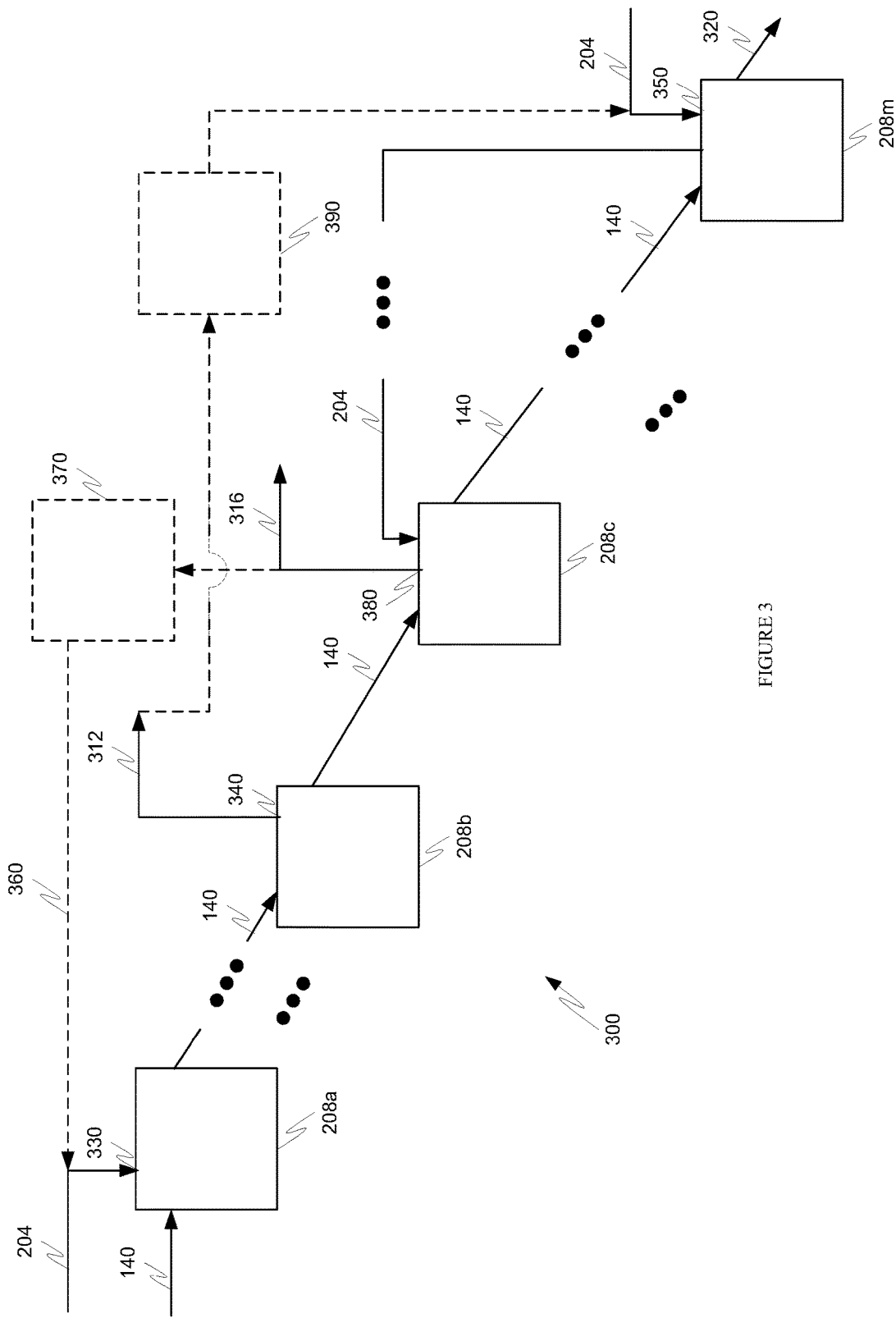
FIG. 3 is a resin-in-leach circuit according to an embodiment.

An embodiment of a resin-in-leach circuit according to the present disclosure is shown in FIG. 3.

FIG. 3 depicts a resin-in-leach 300 (or resin-in-pulp) circuit 300, which includes a plurality of first, second, third, . . . mth tanks 208*a-m*. The first, second, third, . . . mth tanks 208*a-m* are typically air-agitated (e.g., Pachuca-type) vessels to maintain resin and slurry well mixed and provide air-lift for resin-slurry transfer into and out of the tanks. Static sieve bend screens (DSM type) are used to separate the resin from the slurry 140. Fresh resin 204 (and/or partially gold and/or silver loaded resin 204 from one or more of tanks 208*c-m* and/or stripped and/or regenerated resin from a first output 340), which is a strong-base anion exchange resins and more typically Purolite™ A500C, is contacted, via a first input 330 with the slurry 140 in the first tank 208*a* containing the highest amount of gold (and/or silver) (among the first, second, third, . . . mth tanks) and with the slurry 140 in the final tank 208*m* containing the lowest amount of gold (and/or silver) (among the first, second, third, . . . mth tanks). The resin 204 added to the first tank 208*a* moves co-current with the slurry 140, and gold (and/or silver) loaded resin 312, typically containing most of the gold (and/or silver) in the leached gold (and/or silver)-containing material is removed, via a first output 340, from the second tank 208*b* (hereinafter "the co-current portion of the circuit"). The resin 204 added, via a second input 350, to the final tank 208*m* moves counter-current to the slurry 140 and gold (and/or silver) loaded resin 316 is removed, via an output 360, from the third tank 208*c* (hereinafter "the counter-current portion of the circuit"). Barren tailings 320 are removed from the nth tank 208*n*, and gold and/or silver- and interferent-loaded resin 316 are removed from second output 380. In various configurations, the resin 204 added to the second input 350 may be gold and/or silver- and/or treated, and/or regenerated resin from the first and/or second outputs 340 and 380 and/or fresh resin.

As will be appreciated, it is not necessary to have only two tanks with resin flowing co-currently. Any number of tanks can be used. For example, it is possible to have only one tank or more than two tanks with an appropriate resin concentration. Multiple tanks are commonly employed to minimize short circuiting of the slurry.

The slurry 140, in one application, has a solids content ranging from about 30 to about 50 vol. %.

In the first tank 208*a*, the slurry 140 is contacted with a gold (and/or silver) lixiviant, which is preferably an alkaline earth, alkali metal, or ammonium thiosulfate, dilution water, and optionally copper (typically as copper sulfate). In one application, the slurry 140 is contacted with sufficient thiosulfate to yield a thiosulfate concentration in the slurry 140 ranging from about 0.005 to about 2 molar. Preferably, copper, when present, is added to the feed slurry at a concentration ranging from about 10 to about 100 ppm, more preferably from about 25 to about 100 ppm, and more preferably of about 50 ppm. Copper addition may not be required when a sufficient level of copper from the gold (and/or silver)-containing material leaches into the slurry. Although the exact mechanism of how copper improves the leaching is not well understood, copper is believed to accelerate thiosulfate leaching kinetics. Preferably, there is little, or no, ammonia in the system.

The leaching conditions can vary. Preferably, the temperature of leaching ranges from about 40° C. to 80° C., more preferably from about 40 to about 60° C., with the more preferred target being about 50° C. Higher temperatures may result in excessive resin degradation. Preferably, pH in the leaching is maintained at about pH 7.5 to pH 10, more preferably from about pH 7.5 to about pH 9, with a more preferred target of about pH 8.0. Preferably, the oxidation-reduction-potential ("ORP") (with respect to the Ag/AgCl reference electrode) in leaching is in the range of about −100 mV to +50 mV, though this may vary depending on the type of ores being leached. Commonly, the slurry residence ranges from about 1 to about 5 hours/tank and more commonly from about 3 to about 4 hours/tank. The total slurry residence time for the circuit typically ranges from about 10 to about 25 hours.

The resin contacted with the slurry in the first tank is typically added at a rate of from about 1 to about 3 L/hr. The resin is typically allowed to build up in the second and third tanks 208b-c to a concentration ranging from about 10 to about 25 g/L and more typically from about 12.5 to about 17.5 g/L of slurry.

The first and second tanks 208*a-b* are typically highly oxygenated while the third . . . mth tanks 208*c-m* (in which the resin flows counter-currently) are typically poorly oxygenated. In one application, the first and second tanks 208*a-b* commonly have a dissolved molecular oxygen content of at least about 5 ppm and more commonly ranging from about 6 to about 10 ppm while the third . . . mth tanks 208*c-m* have a dissolved molecular oxygen content of less than about 5 ppm and more commonly ranging from about 1 to about 4 ppm.

In one configuration, gold (and/or silver)-loaded resin from the second and third tanks 208*b* and *c* is stripped of gold and/or silver with suitable stripping agents, including, for example, halide salts (e.g., sodium chloride, a perchlorate, and the like), polythionate, a nitrate, a thiocyanate, a thiourea, a mixture of sulfite and ammonia, thiosulfate, and mixtures thereof. The gold (and/or silver)-containing stripping agent may be processed by any suitable gold (and/or silver) recovery technique, such as electrowinning or precipitation, to extract the dissolved or stripped gold (and/or silver) and form the gold (and/or silver) product. Elution is normally conducted at a pH ranging from about pH 7 to pH 9 to eliminate substantially osmotic shock on the resin.

In one process configuration, gold (and/or silver)-loaded resin removed from the third tank 208*c* is treated in unit operation 370 with a sulfite solution to remove most, if not all of, deleterious polythionates (particularly penta and tetrathionate) and the treated gold (and/or silver)-loaded resin 360 is added to the first tank 208*a* as a partially gold (and/or silver) loaded resin. Other sulfur and sulfoxy agents may be used to remove deleterious polythionates from the gold (and/or silver) and inferent-loaded resin to increase gold (and/or silver) loading without transferring penta- and tetrathionate interferents. For example, a polysulfide other than a bisulfide, a bisulfide, a sulfide other than a bisulfide and a polysulfide, and mixtures thereof may be used to convert tetrathionate, pentathionate and other higher polythionates into thiosulfate. To avoid precipitation of gold (and/or silver) sulfide, however, the conditions should be carefully controlled to maximize thiosulfate formation while substantially minimizing gold (and/or silver) sulfide precipitation. The sulfite, sulfur, or sulfoxy agent converts tetrathionate, pentathionate and other higher polythionates to trithionates while leaving the gold (and/or silver) adsorbed on the resin. The treated gold and/or silver resin is removed from the first output 340, stripped of gold and/or silver in unit operation 390, and re-inputted at the second input 350.

It is to be understood that any number of tanks may, respectively, be in the co-current and counter-current portions of the circuit Although typical resin concentrations are provided herein, it is to be understood that resin concentrations will vary depending upon the amount of gold (and/or silver) leached in the feed material.

The circuit 300 can promote fast gold adsorption kinetics from the slurry at the front end of the circuit and prevent gold loss by preg robbing or other mechanism which reduce gold (and/or silver) recovery. As noted, the circuit operates by adding resin and slurry to the first tank and transferring both co-currently to the second tank, where the resin is removed and the gold (and/or silver) recovered. By adding resin in a co-current flow to the first tank, there are no interfering compounds from subsequent leach tanks being transferred to the tanks at the beginning of the circuit. The resin added to the first tank is retained in the second tank until the concentration builds up. Allowing the resin concentration to build to the second tank can substantially minimize the effects of changes in the ore type. Although two tanks are shown in the co-current portion in the Figures, it is to be understood that any number of tanks may be employed. For example, a single tank would be sufficient, if short circuiting of the slurry can be avoided.

It is to be understood that the current process is not limited to the reduction of gold (and/or silver) recovery due simply to the presence of a preg-robbing carbonaceous material. While not wishing to be bound by any theory, there appear to be several mechanisms at work in a standard resin-in-leach or resin-in-pulp circuit in reducing gold (and/or silver) recovery. It is often not possible to define which mechanism(s) is contributing individually or collectively to gold (and/or silver) loss. The mixed flow process disclosed herein is designed to reduce the influence of tetrathionate, pentathionate, and other higher polythionate loading on the resin, on lowering gold (and/or silver) recovery, as well as on other preg robbing components, such as carbonaceous material, silica, and/or iron oxide.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Figure 5:
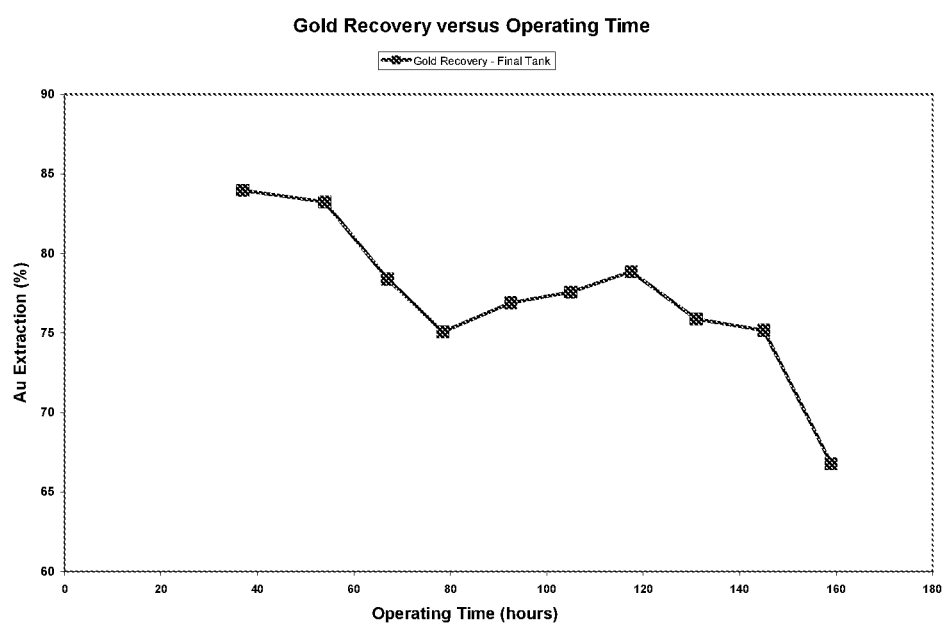
FIG. 5 is a plot of gold extraction (percent) (vertical axis) against operating time (hours) (horizontal axis)

FIG. 5 shows the gold recovery from a conventional counter current operation (such as that shown in FIG. 2) that was operated in steady state for a period of 150 hours. The overall gold recovery as determined by the percent of the gold remaining in the tails, decreased as the operating time increased. The gold recovery dropped from 44% to 27.4% or 16.8% in tank 1, and from 84% to 66.8% or 17.2% in tank 8. It is clear that the loss of gold recovery in tank 1 was not compensated for as the slurry passed through the subsequent tanks.

Figure 6:
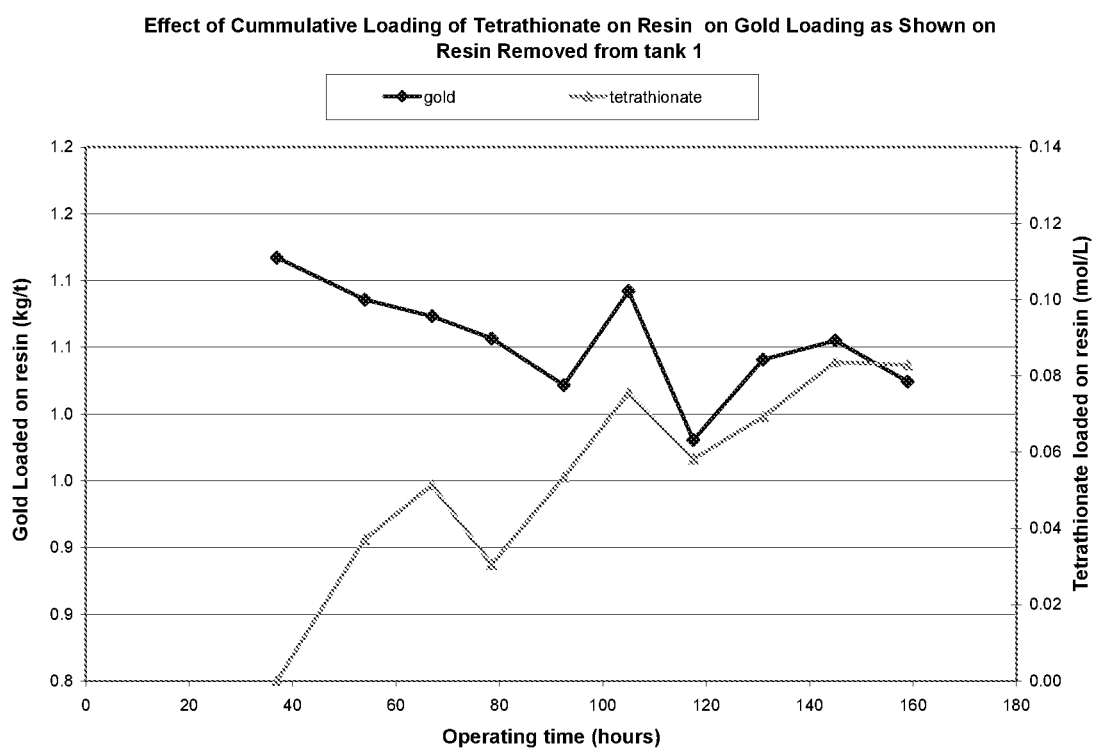
FIG. 6 is a plot of gold loaded on resin (kg/t) (vertical axis) against operating time (hours) (horizontal axis) and a plot of tetrathionate loaded on resin (kg/t) against operation time (hours)

FIG. 6 shows the relationship between tetrathionate adsorbed by the resin and gold recovery. An analysis of the resin removed from the first tank of the counter current operation shows that as the amount of tetrathionate adsorbed to the resin increased as the amount of gold adsorbed decreased, suggesting that adsorption on the resin of non targeted compounds can reduce the recovery of gold. As the resin moves from the back end of the circuit to the front end of the circuit there is an opportunity for these compounds to be carried to the front of the circuit.

In one configuration, six resin-in-leach tanks were used in the circuit 300. Each tank has a preferred individual residence time of about 3-4 hours each for a total preferred leaching residence time of about 10-24 hours. The total number of tanks may be altered depending on the leaching kinetics.

The first and second tanks 208a-b operate with the resin co-current with the movement of the gold bearing slurry. The feed slurry includes about 48% solids, has a flow rate of about 985 lb/hour or 0.201 mt solid/hour, and a dissolved gold concentration of about 2.5 g/mt. Other additives to the first tank include resin at a typical concentration of about 3.37 ml/L, dilution water at a typical rate of about 28 g/hr, calcium thiosulfate at a typical rate of about 5.2 g/hr, and copper sulfate at a typical rate of about 0.6 g/hr. The first and second co-current tanks have a dissolved molecular oxygen level of amount 7-8 ppm while the four counter-current tanks have a dissolved molecular oxygen level of about 2-3 ppm. The resin concentration in the first tank is about 3.37 ml/L and in the second tank about 15 ml/L. Typically, the resin concentration is maintained at about 15 ml/L by removing the resin from the second tank 208b at approximately the same rate it is added to the first tank 208a. Highly loaded resin is withdrawn from the second tank at a rate of about 1.5 L/hr and contains about 705.51 g/mt gold.

The third through sixth tanks operate with about 5 mL/L resin moving counter-current to the movement of the gold-bearing slurry.

The highest level of gold loading typically occurs in the second tank.

The third through sixth tanks operate to scavenge the remaining gold in the gold bearing slurry.

Figure 7:
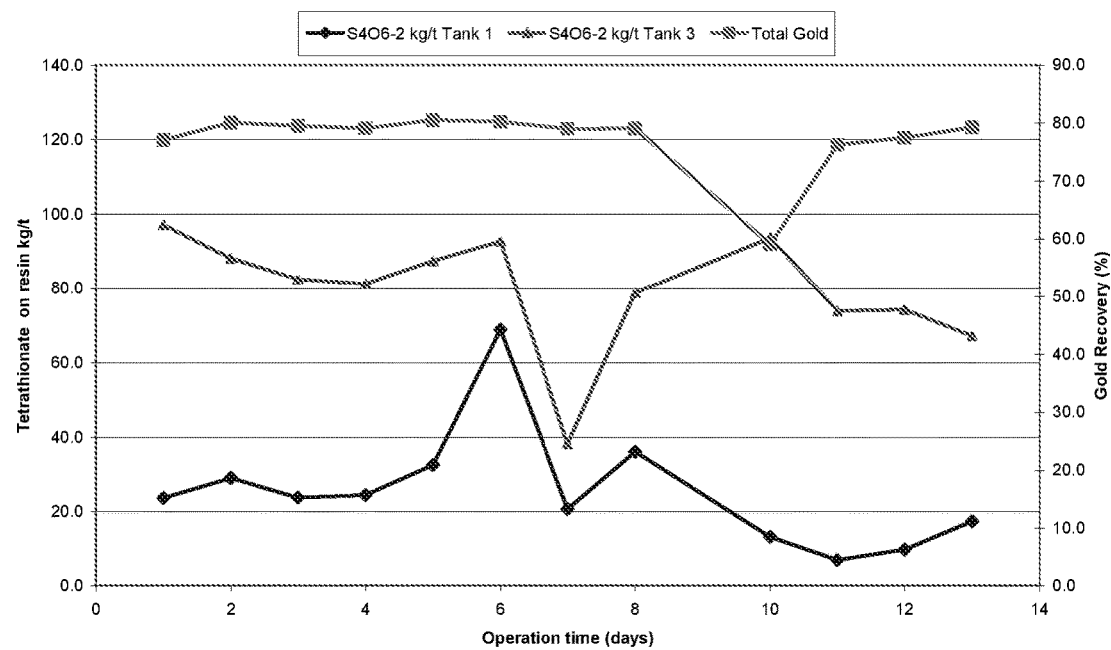
FIG. 7 is a plot of gold loaded on resin (kg/t) (vertical axis) against operating time (days) and a plot of tetrathionate loaded on resin (kg/t) against operation time (days).

FIG. 7 demonstrates resin transfer in a co-current (tanks 1 and 2) and counter current (tanks 3 through 6) portions of the circuit. The co-current portion can create conditions in which gold recovery does not decrease over time. As can be seen from the graph, the tetrathionate level in tank 1, where the majority of the gold is leached and adsorbed by the resin, is significantly lower than that observed in the third tank, which is the terminus of the counter-current resin transfer.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure.

The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising: leaching, by thiosulfate, a gold and/or silver-containing material in at least one of an ion-exchange resin-in-leach and ion-exchange resin-in-pulp circuit, the circuit comprising a co-current portion where the gold and/or silver-containing material and a gold and/or silver-collecting ion-exchange resin flow co-currently and a counter-current portion where the gold and/or silver-containing material and gold and/or silver-collecting ion-exchange resin flow counter-currently, wherein the gold and/or silver-containing material flows first through the co-current portion and second through the counter-current portion, wherein the counter-current portion comprises a polythionate- and gold-and/or silver-loaded ion-exchange resin comprising one or more polythionates sorbed on the polythionate- and gold- and/or silver-loaded ion-exchange resin and wherein one of following is true:
   (i) wherein the polythionates comprise predominately a tetrathionate and/or other higher polythionates; or
   (ii) wherein the polythionates comprise predominately one or more trithionates.

2. The method of claim 1, wherein the co-current and counter-current portions do not share a common resin-in-leach or resin-in-pulp tank.

3. The method of claim 1, wherein at least most of the gold and/or silver in the co-current portion is collected by the ion-exchange resin in the co-current portion, and wherein at least most of the gold and/or silver in the counter-current portion is collected by the ion-exchange resin in the counter-current portion.

4. The method of claim 3, wherein most or all of a gold and/or silver-loaded ion-exchange resin in the co-current portion is removed from a tank in the co-current portion and most or all of a gold and/or silver-loaded ion-exchange resin in the counter-current portion is removed from the counter-current portion.

5. The method of claim 1, wherein a first ion-exchange resin concentration in a part of the co-current portion is greater than a second ion-exchange resin concentration in a part of the counter-current portion and wherein in the counter-current portion, polythionate ions on the one hand and gold and/or silver on the other competitively collect on the ion-exchange resin.

6. The method of claim 5, wherein an average and median ion-exchange resin concentration in the co-current portion is greater than a respective average and median ion-exchange resin concentration in the counter-current portion.

7. The method of claim 5, wherein a maximum ion-exchange resin concentration in the co-current portion exceeds a maximum ion-exchange resin concentration in the counter-current portion.

8. The method of claim 5, wherein a minimum ion-exchange resin concentration in the co-current portion exceeds a minimum ion-exchange resin concentration in the counter-current portion.

9. The method of claim 1, wherein (i) is true, wherein the thiosulfate is substantially free of ammonia, wherein a leach solution in the counter-current portion comprises dissolved thiosulfate and polythionates, wherein the ion-exchange resin collects, from the leach solution, the polythionates, wherein the polythionate, gold- and/or silver-loaded ion-exchange resin is removed from the co-current portion and contacted with sulfite to convert collected polythionates to trithionates to form a treated gold and/or silver-containing ion-exchange resin, wherein the treated gold and/or silver-containing ion-exchange resin is introduced into the counter-current portion to form a further loaded treated gold and/or silver-containing ion-exchange resin, wherein at least most of the gold and/or silver remains collected on the gold and/or silver-containing ion-exchange resin after sulfite contact, wherein the further loaded treated gold and/or silver-containing ion-exchange resin, after removal from the counter-current portion, is contacted with a stripping solution to remove at least most of the gold and/or silver from the treated gold and/or silver-containing ion-exchange resin, to form a stripped ion-exchange resin, wherein the stripped ion-exchange resin is introduced into the co-current portion, and wherein the gold and/or silver-containing material comprises a preg-robbing material.

10. The method of claim 9, wherein the gold and/or silver is gold, wherein higher polythionate- and gold-loaded ion-exchange resin from the counter-current portion is treated to remove most or all of the higher polythionate but most or all of the gold remains loaded on the ion-exchange resin to form a treated gold-loaded ion-exchange resin and wherein the treated gold-loaded ion-exchange resin is introduced into the co-current portion.

11. The method of claim 10, wherein the treated gold-loaded ion-exchange resin is loaded with more gold in the co-current portion to form further gold-loaded ion-exchange resin, wherein the further gold-loaded ion-exchange resin is removed from the co-current portion and subjected to stripping to remove most or all of the gold from the further gold-loaded ion-exchange resin and form a gold and/or silver stripped ion-exchange resin.

12. The method of claim 11, wherein the gold and/or silver stripped ion-exchange resin is reintroduced into the counter-current portion.

13. The method of clam 1, wherein (ii) is true, wherein the polythionate-and gold- and/or silver-loaded ion-exchange resin is introduced into the counter-current portion to form a further loaded gold- and/or silver-loaded ion-exchange resin, wherein at least most of the gold and/or silver remains collected on the further loaded gold- and/or silver-loaded ion-exchange resin, wherein the further loaded gold- and/or silver-loaded ion-exchange resin, after removal from the counter-current portion, is contacted with a stripping solution to remove at least most of the gold and/or silver from the further loaded gold- and/or silver-loaded ion-exchange resin, to form a stripped ion-exchange resin, wherein the stripped ion-exchange resin is introduced into the co-current portion, and wherein the gold and/or silver-containing material comprises a preg-robbing material.

14. The method of claim 1, wherein most or all of a gold and/or silver-loaded ion-exchange resin in the co-current portion and most or all of a gold and/or silver-loaded ion-exchange resin in the counter-current portion are removed from a common tank.

15. A method, comprising: thiosulfate leaching, by at least one of a resin-in-leach and resin-in-pulp circuit, a gold-containing material, the at least one of a resin-in-leach and resin-in-pulp circuit comprising a co-current portion in which the gold-containing material and an ion exchange resin flow co-currently and a counter-current portion in which the gold-containing material and ion exchange resin flow counter-currently, the gold-containing material flowing first through the co-current portion and second through the counter-current portion, wherein a gold-loaded ion-exchange resin is stripped of gold and treated to remove a higher polythionate collected on the gold-loaded ion-exchange resin in separate steps using differing solutions, wherein the counter-current portion comprises a polythionate- and gold- and/or silver-loaded ion-exchange resin comprising one or more polythionates sorbed on the polythionate- and gold- and/or silver-loaded ion-exchange resin and wherein one of following is true:
(i) wherein the one or more polythionates are predominately a tetrathionate and/or other higher polythionates; or
(ii) wherein the polythionates are predominately one or more trithionates.

16. The method of claim 15, wherein the co-current and counter-current portions do not share a common resin-in-leach or resin-in-pulp tank.

17. The method of claim 15, wherein, relative to the flow of the gold-containing material, the co-current portion is located upstream of the counter-current portion.

18. The method of claim 17, wherein most or all of a gold-loaded ion-exchange resin in the co-current portion is removed from the co-current portion and most or all of a gold-loaded ion-exchange resin from the counter-current portion is removed from the counter-current portion.

19. The method of claim 15, wherein a first ion-exchange resin concentration in a part of the co-current portion is greater than a second ion-exchange resin concentration in a part of the counter-current portion.

20. The method of claim 19, wherein an average and median ion-exchange resin concentration in the co-current portion is greater than a respective average and median ion-exchange resin concentration in the counter-current portion.

21. The method of claim 19, wherein a maximum ion-exchange resin concentration in the co-current portion exceeds a maximum ion-exchange resin concentration in the counter-current portion.

22. The method of claim 19, wherein a minimum ion-exchange resin concentration in the co-current portion exceeds a minimum ion-exchange resin concentration in the counter-current portion.

23. The method of claim 15, wherein the thiosulfate is substantially free of ammonia, wherein a leach solution in the counter-current portion comprises dissolved gold, thiosulfate, and polythionates, wherein the ion-exchange resin collects, from the leach solution, higher polythionates and gold, and wherein the gold-containing material comprises a preg-robbing carbonaceous material.

24. The method of claim 23, wherein (i) is true, wherein the polythionate-and gold-loaded ion-exchange resin from the counter-current portion is treated to remove most or all of the tetrathionates and higher polythionates sorbed on the polythionate- and gold-loaded ion-exchange resin but most or all of the gold remains loaded on the ion-exchange resin to form a treated gold-loaded ion-exchange resin and wherein the treated gold-loaded ion-exchange resin is introduced into the co-current portion.

25. The method of claim 24, wherein the treated gold-loaded ion-exchange resin is loaded with more gold in the co-current portion to form further gold-loaded ion-exchange resin, wherein the further gold-loaded ion-exchange resin is removed from the co-current portion and subjected to gold stripping to remove most or all of the gold from the further gold-loaded ion-exchange resin and form a treated gold-stripped ion-exchange resin.

26. The method of claim 25, wherein the treated gold-stripped ion-exchange resin is reintroduced into the counter-current portion.

27. The method of claim 15, wherein (ii) is true, wherein a thiosulfate leach solution in the counter-current portion comprises dissolved gold, thiosulfate, and polythionates, wherein the resin collects, from the leach solution, tetrathionate and the higher polythionates and gold to form the polythionate- and gold-loaded ion-exchange resin, wherein the polythionate- and gold-loaded ion-exchange resin is removed from the co-current portion and contacted with sulfite to convert collected tetrathionates and higher polythionates to trithionates to form a treated gold-containing ion-exchange resin, wherein the treated gold-containing ion-exchange resin is introduced into the counter-current portion to form the gold-loaded ion- exchange resin, wherein most or all of the gold remains collected on the partially gold-loaded ion-exchange resin after sulfite contact, wherein the gold-loaded ion-exchange resin, after removal from the counter-current portion, is contacted with a stripping solution to remove most or all of the gold from the gold-loaded ion-exchange resin, to form a stripped ion-exchange resin, and wherein the stripped ion-exchange resin is introduced into the co-current portion.

28. The method of claim 15, wherein (i) is true, wherein the tetrathionate and the higher polythionates are removed by contacting the tetrathionates and the higher polythionates on the polythionate- and gold-loaded ion-exchange resin with sulfite to form a polythionate-free, gold-loaded ion-exchange resin, wherein most or all of the collected gold remains on the ion-exchange resin, and wherein most or all of the gold is removed from the polythionate-free, gold-loaded ion-exchange resin by contacting the polythionate-free, gold-loaded ion-exchange resin with a stripping agent comprising one or more of a halide salt, polythionate, nitrate, thiocyanate, thiourea, a mixture of sulfite and ammonia, and thiosulfate.

29. The method of clam 15, wherein (ii) is true, wherein the polythionate-and gold- and/or silver-loaded ion-exchange resin is introduced into the counter-current portion to form a further loaded gold- and/or silver-loaded ion-exchange resin, wherein at least most of the gold and/or silver remains collected on the further loaded gold- and/or silver-loaded ion-exchange resin, wherein the further loaded gold- and/or silver-loaded ion-exchange resin, after removal from the counter-current portion, is contacted with a stripping solution to remove at least most of the gold and/or silver from the further loaded gold- and/or silver-loaded ion-exchange resin, to form a stripped ion-exchange resin, wherein the stripped ion-exchange resin is introduced into the co-current portion, and wherein the gold and/or silver-containing material comprises a preg-robbing material.

30. The method of claim 28, wherein the stripping agent comprises one or more of a halide salt, polythionate, nitrate, thiocyanate, thiourea, a mixture of sulfite and ammonia, and thiosulfate.

31. The method of claim 15, wherein most or all of a gold-loaded resin in the co-current portion and most or all of a gold-loaded ion-exchange resin in the counter-current portion are removed from a common tank.

32. The method of claim 15, wherein most or all of the gold and/or silver leached from the gold and/or silver-containing material is collected by the ion exchange resin in the co-current portion.

33. The method of claim 15, wherein a dissolved molecular oxygen content of a thiosulfate-containing leach solution in the co-current portion is at least 5 ppm and a dissolved molecular oxygen content of the thiosulfate leach solution in the counter-current portion is less than 5 ppm.

* * * * *